(12) United States Patent
Davis et al.

(10) Patent No.: US 11,344,079 B2
(45) Date of Patent: May 31, 2022

(54) ARTICLE OF FOOTWEAR WITH EXTRUDED COMPONENTS

(71) Applicant: Reebok International Limited, London (GB)

(72) Inventors: Paul Davis, Blackstone, MA (US); Mike Andrews, East Falmouth, MA (US); Dustin Simone, Boston, MA (US)

(73) Assignee: Reebok International Limited, London (GB)

( * ) Notice: Subject to any disclaimer, the term of this patent is extended or adjusted under 35 U.S.C. 154(b) by 0 days.

(21) Appl. No.: 16/014,854

(22) Filed: Jun. 21, 2018

(65) Prior Publication Data

US 2018/0295933 A1 Oct. 18, 2018

Related U.S. Application Data

(63) Continuation of application No. 14/455,650, filed on Aug. 8, 2014, now Pat. No. 10,945,488.

(60) Provisional application No. 61/864,280, filed on Aug. 9, 2013.

(51) Int. Cl.
| | |
|---|---|
| *A43B 13/14* | (2006.01) |
| *A43B 13/18* | (2006.01) |
| *A43B 13/02* | (2022.01) |
| *B33Y 80/00* | (2015.01) |
| *B29D 35/14* | (2010.01) |
| *B29C 64/118* | (2017.01) |

(Continued)

(52) U.S. Cl.
CPC ............ *A43B 13/14* (2013.01); *A43B 13/023* (2013.01); *A43B 13/12* (2013.01); *A43B 13/181* (2013.01); *A43B 23/0245* (2013.01); *B29D 35/142* (2013.01); *B33Y 80/00* (2014.12); *B29C 64/118* (2017.08)

(58) Field of Classification Search
CPC ....... A43B 13/14; A43B 13/12; A43B 13/023; A43B 13/181; A43B 1/14; A43B 23/0245; B33Y 80/00; B29C 67/0055; B29D 35/142
See application file for complete search history.

(56) References Cited

U.S. PATENT DOCUMENTS

| | | | |
|---|---|---|---|
| 2,100,492 | A | 11/1937 | Sindler |
| 2,325,656 | A | 8/1943 | Brophy |
| 3,251,728 | A | 5/1966 | Humbert et al. |

(Continued)

FOREIGN PATENT DOCUMENTS

| | | |
|---|---|---|
| CH | 707511 A2 | 7/2014 |
| CN | 1066620 C | 6/2001 |

(Continued)

*Primary Examiner* — Katharine G Kane
(74) *Attorney, Agent, or Firm* — Sterne, Kessler, Goldstein & Fox P.L.L.C.

(57) ABSTRACT

The disclosed embodiments relate to portions of an article of footwear formed from an extruded member. In certain embodiments, a sole or portion of a sole can be formed from one or more extruded members. In certain embodiments, the extruded member can be a single, continuous piece of solid material. In certain embodiments, a sole for an article of footwear can be fashioned from an extruded member formed in a controlled geometric pattern. In certain embodiments, the sole can include one or more layers.

17 Claims, 30 Drawing Sheets

(51) Int. Cl.
  *A43B 23/02* (2006.01)
  *A43B 13/12* (2006.01)

(56) References Cited

U.S. PATENT DOCUMENTS

| | | | |
|---|---|---|---|
| 3,719,965 A | 3/1973 | Chevallereau | |
| 4,031,854 A | 6/1977 | Sprague, Jr. | |
| 4,098,632 A | 7/1978 | Sprague, Jr. | |
| 4,236,268 A | 12/1980 | Bradley et al. | |
| 4,249,320 A | 2/1981 | Hollick | |
| RE30,646 E | 6/1981 | Vomberger et al. | |
| 4,272,898 A | 6/1981 | Tansill | |
| 4,272,989 A | 6/1981 | Rymarchyk et al. | |
| 4,313,395 A | 2/1982 | Runions | |
| 4,431,311 A | 2/1984 | Kolossow | |
| 4,536,974 A | 8/1985 | Cohen | |
| 4,593,482 A | 6/1986 | Mayer | |
| 4,611,412 A | 9/1986 | Cohen | |
| 4,642,829 A | 2/1987 | McIlvin | |
| 4,749,347 A | 6/1988 | Valavaara | |
| 4,753,021 A | 6/1988 | Cohen | |
| 4,754,559 A | 7/1988 | Cohen | |
| 4,858,337 A | 8/1989 | Barma | |
| 4,952,450 A | 8/1990 | Noel | |
| 4,996,012 A | 2/1991 | Gierschewski et al. | |
| 5,063,018 A | 11/1991 | Fontirroche et al. | |
| 5,121,329 A | 6/1992 | Crump | |
| 5,233,767 A | 8/1993 | Kramer | |
| 5,713,140 A | 2/1998 | Baggenstoss | |
| 5,916,006 A | 6/1999 | Ganson | |
| 6,280,478 B1 | 8/2001 | Richter et al. | |
| 6,782,642 B2 | 8/2004 | Knoche et al. | |
| 7,192,069 B1 | 3/2007 | Daniel | |
| 7,926,204 B2 | 4/2011 | Ungari et al. | |
| 8,647,098 B2 * | 2/2014 | Swanson | B33Y 30/00 |
| | | | 425/113 |
| 8,993,061 B2 | 3/2015 | Jones et al. | |
| 9,155,352 B2 | 10/2015 | Seo | |
| 2006/0276095 A1 | 12/2006 | Dua et al. | |
| 2006/0288612 A1 | 12/2006 | Lucas et al. | |
| 2007/0071902 A1* | 3/2007 | Dietrich | B29C 64/106 |
| | | | 427/402 |
| 2007/0098898 A1 | 5/2007 | Wu | |
| 2007/0170610 A1 | 7/2007 | Payne et al. | |
| 2007/0266593 A1 | 11/2007 | Schindler et al. | |
| 2007/0271713 A1 | 11/2007 | Koo et al. | |
| 2008/0271339 A1 | 11/2008 | Fischer | |
| 2009/0013558 A1 | 1/2009 | Hazenberg et al. | |
| 2009/0094858 A1 | 4/2009 | Ungari et al. | |
| 2009/0126225 A1* | 5/2009 | Jarvis | A43B 13/41 |
| | | | 36/29 |
| 2009/0247658 A1 | 10/2009 | Kobayashi et al. | |
| 2009/0249656 A1 | 10/2009 | Shelton et al. | |
| 2011/0016746 A1 | 1/2011 | Callahan et al. | |
| 2011/0154584 A1 | 6/2011 | Ungari et al. | |
| 2011/0232130 A1 | 9/2011 | Boudreau et al. | |
| 2012/0180344 A1 | 7/2012 | Crowley, II et al. | |
| 2013/0145650 A1 | 6/2013 | Seo | |
| 2013/0260104 A1 | 10/2013 | Dua et al. | |
| 2014/0020192 A1 | 1/2014 | Jones et al. | |
| 2014/0196306 A1 | 7/2014 | Gill | |
| 2014/0230276 A1 | 8/2014 | Campos, II et al. | |
| 2015/0040428 A1 | 2/2015 | Davis et al. | |
| 2015/0165690 A1* | 6/2015 | Tow | B33Y 80/00 |
| | | | 700/119 |
| 2015/0321418 A1 | 11/2015 | Sterman | |
| 2016/0219982 A1 | 8/2016 | Waatti | |
| 2017/0157846 A1 | 6/2017 | Miller et al. | |

FOREIGN PATENT DOCUMENTS

| | | |
|---|---|---|
| CN | 101820788 | 9/2001 |
| CN | 1817261 | 8/2006 |
| DE | 1279314 B | 10/1968 |
| DE | 202017103049 U1 | 6/2017 |
| EP | 0130816 A2 | 1/1985 |
| EP | 2684479 A2 | 1/2014 |
| GB | 596562 | 1/1948 |
| WO | WO 97/03582 A1 | 6/1997 |
| WO | WO 2009057107 A2 | 5/2009 |
| WO | WO 2014100462 A1 | 6/2014 |
| WO | WO 2017083013 A1 | 5/2017 |

* cited by examiner

ARTICLE OF FOOTWEAR WITH EXTRUDED COMPONENTS

CROSS-REFERENCE TO RELATED APPLICATION

This application is a continuation of U.S. patent application Ser. No. 14/455,650, filed Aug. 8, 2014 and entitled, "Article Of Footwear With Extruded Components," the disclosure of which is incorporated herein in its entirety by reference thereto. U.S. patent application Ser. No. 14/455,650 claims priority to U.S. Provisional Application No. 61/864,280, filed Aug. 9, 2013 and entitled, "Article Of Footwear With Extruded Components," the disclosure of which also is incorporated herein in its entirety by reference thereto.

BACKGROUND OF THE INVENTION

Field of the Invention

The present disclosure relates to footwear. More specifically, the present disclosure relates to embodiments of footwear having a sole and/or upper portion described herein.

Background Art

Individuals can be concerned with the amount of cushioning an article of footwear provides, as well as the aesthetic appeal of the article of footwear. This is true for articles of footwear worn for non-performance activities, such as a leisurely stroll, and for performance activities, such as running, because throughout the course of an average day, the feet and legs of an individual are subjected to substantial impact forces. When an article of footwear contacts a surface, considerable forces may act on the article of footwear and, correspondingly, the wearer's foot. The sole functions, in part, to provide cushioning to the wearer's foot and to protect it from these forces. To achieve adequate cushioning, many footwear soles are thick and heavy. When sole size and/or weight are reduced to achieve other performance goals, protection of the wearer's foot is often compromised.

The human foot is a complex and remarkable piece of machinery, capable of withstanding and dissipating many impact forces. The natural padding of fat at the heel and forefoot, as well as the flexibility of the arch, help to cushion the foot. Although the human foot possesses natural cushioning and rebounding characteristics, the foot alone is incapable of effectively overcoming many of the forces encountered during every day activity. Unless an individual is wearing footwear that provides proper cushioning, support, and flexibility, the soreness and fatigue associated with every day activity is more acute, and its onset accelerated. The discomfort for the wearer that results may diminish the incentive for further activity. Also, inadequate cushioning, support, or flexibility in an article of footwear can lead to injuries such as blisters; muscle, tendon and ligament damage; and bone stress fractures. Improper footwear can also lead to other ailments, including back pain.

BRIEF SUMMARY

The disclosed embodiments relate to portions of an article of footwear formed from an extruded member. In certain embodiments, a sole or portion of a sole can be formed from one or more extruded members. In certain embodiments, the extruded member can be a single, continuous piece of solid material. An extruded footwear component, such as a sole, can have advantages over traditionally formed components, such as injection molded components. For example, an extruded sole can be customized without having to machine a new, expensive mold. The use of extruded members can also allow for the use of shapes and geometries that are difficult to achieve using conventional molding techniques.

In certain embodiments, a sole for an article of footwear can include an extruded member formed in a controlled geometric pattern. In certain embodiments, the sole can include one or more layers. In certain embodiments, each layer can have one or more extruded members. In certain embodiments, the layers can be non-woven layers. In certain embodiments, at least two layers can be formed from the same extruded member.

In certain embodiments, a sole for an article of footwear can be formed from one or more solid extruded members arranged in a controlled geometric pattern having one or more layers. In certain embodiments, a first layer can be formed from a first solid extruded member and a second layer can be formed from a second solid extruded member. In certain embodiments, a first layer can run in a transverse direction of the sole and a second layer can run in a lengthwise direction of the sole. In certain embodiments, a first layer can run in a lengthwise direction of the sole and a second layer can run in a transverse direction of the sole. In certain embodiments, a first and third layer can run in a first direction and a second layer can run in a second direction. In certain embodiments, the first and second directions can be generally perpendicular.

In certain embodiments, various areas of the sole can include more layers of one or more extruded members than other areas of the sole. For example, in certain embodiments, a heel or rearfoot area of the sole can have more layers than a midfoot area and/or forefoot area of the sole. In certain embodiments, a rearfoot area of the sole can have a coiled shape, designed to provide additional support and/or cushioning for a wearer's heel. In certain embodiments, a midfoot area of the sole can have more layers than a rearfoot area and/or forefoot area of the sole. In certain embodiments, a forefoot area of the sole can have more layers than a rearfoot area and/or midfoot area of the sole.

Each layer can be formed in a controlled pattern. In certain embodiments, a layer can be planar such that the layer is the thickness of a single extruded member. Multiple patterns can be included in a single layer. A layer that includes multiple patterns can have the same or different patterns within the layer, and one layer can have the same or different pattern from another layer. In certain embodiments, at least one layer can have a pattern with one or more gaps between the one or more extruded members. In certain embodiments, at least one layer can have a plurality of undulations. In certain embodiments, each undulation can contact an adjacent undulation. In certain embodiments, the undulations can run in a transverse direction of the sole, or at an angle with respect to the lengthwise direction of the sole. In certain embodiments, each undulation can form a loop having an open space. In certain embodiments, the loops can have a round, flat, or angled end portion at the medial or lateral side of the sole. In certain embodiments, the undulations can extend partially or entirely from a medial side to a lateral side of the sole.

Various physical properties of the extruded member can be manipulated, adjusted, altered, and/or modified. For example, in certain embodiments, the width, length, shape, wall thickness, color, density, elasticity, material, etc. of the extruded member can vary along the extruded member or between a first and second extruded member.

In certain embodiments, an article of footwear can include an upper and a sole attached to the upper, where the sole is formed from a single, continuous piece of extruded material or a plurality of extruded members. The extruded member can be made of rubber, foam (e.g., dispensed urethane foam), silicone, plastic including thermoplastic (e.g., TPU, nylon, or polypropylene), or any other suitable material. The cross-section of the extruded member can be substantially circular, oval, rectangular, triangular, square, or any other suitable shape or design (e.g., star-shaped).

In certain embodiments, the sole can include a support member, for example a rigid support member, which can be made from any suitable material (e.g., plastic, metal, composite, or a combination of materials). In certain embodiments, the support member can made of a cushioning material such as foam. In certain embodiments, the support member can be located between a first and second layer of the one or more extruded members. The support member can be located along the entire sole or at any portion of the sole, for example, in a rearfoot, midfoot, and/or forefoot area of the sole.

In certain embodiments, the sole can be a midsole having an insole attached to a top surface of the one or more extruded members and an outsole attached to a bottom surface of the one or more extruded members. In certain embodiments, the extruded member can be extruded directly onto the insole and/or outsole. In certain embodiments, an adhesive can be applied to the insole and/or outsole before extruding the extruded member onto it.

Methods of manufacturing an article of footwear and a sole for an article of footwear are also disclosed. In certain embodiments, a method for manufacturing a sole for an article of footwear can include extruding one or more elongated members in a controlled geometric pattern. In certain embodiments, the method can include extruding one or more solid elongated members to form a plurality of layers. In certain embodiments, the method can include extruding a single, continuous elongated member. In certain embodiments, the method can include extruding the elongated member directly onto an outsole.

In certain embodiments, a method for manufacturing a customized sole for an article of footwear can include measuring a physical characteristic of a foot (e.g., pressure data), sending data of the characteristic to a computing device controlling an extruder, and extruding one or more elongated members in a controlled geometric pattern to form the sole based on the pressure data. In certain embodiments, the method can include recording the pressure data in the computing device. In certain embodiments, the method can include analyzing the pressure data using the computing device. In certain embodiments, the method can include designing a pattern for a sole based on the pressure data.

In certain embodiments, one or more extruded members can be extruded directly onto an upper portion of an article of footwear. In certain embodiments, a sole portion can be extruded and an upper can be attached thereto, for example, by stitching or an adhesive. In certain embodiments, an upper or a portion of an upper can be formed from one or more extruded members. In certain embodiments, an article of footwear including a sole and an upper can be formed from one or more extruded members as a single, unitary structure. By way of example, in certain embodiments, one or more extruded members can be extruded onto fabric to form an upper, a midsole, quarter panels, heel counter, etc., and the fabric can be formed, cut, or sewn to form an article of footwear.

Additional features and embodiments will be set forth in the description that follows, and in part will be apparent from the description, or may be learned by practice of the disclosed embodiments. Both the foregoing general description and the following detailed description are exemplary and explanatory and are not meant to be limiting, and are intended to provide further explanation of the embodiments as claimed.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant arts to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

Figure 1:
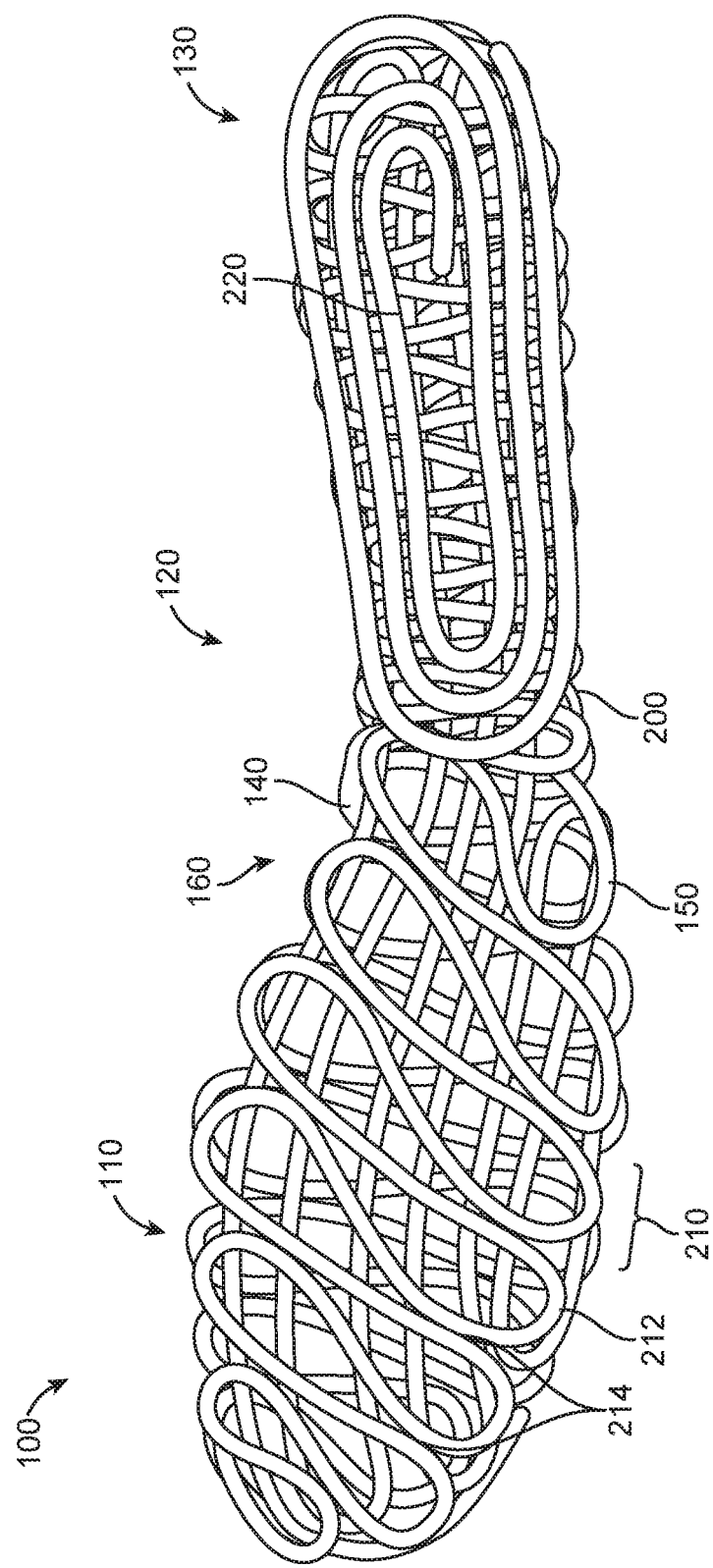
FIG. 1 illustrates a top view of a sole for an article of footwear according to an embodiment presented herein.

Embodiments of the present disclosure will now be described in detail with reference to embodiments thereof as illustrated in the accompanying drawings, in which like reference numerals are used to indicate identical or functionally similar elements. References to "one embodiment", "an embodiment", "some embodiments", "in certain embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It is understood that the term "sole" can refer to an entire sole for an article of footwear, or any portion of a sole for an article of footwear. For example, "sole" can refer to an outsole, midsole, insole, or any portion or combination thereof "Sole" can refer to a forefoot area, midfoot area, or rearfoot area of a sole, or any portion or combination thereof.

Various aspects of the present invention, or any parts or functions thereof, may be implemented using hardware, software, firmware, non-transitory tangible computer readable or computer usable storage media having instructions stored thereon, or a combination thereof, and may be implemented in one or more computer systems or other processing systems.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Embodiments of the present disclosure include a sole 100 for an article of footwear 10 (see FIG. 21) having one or more extruded members 200. Sole 100, including one or more extruded members 200, can provide the desired ride and feel characteristics to the wearer. In certain embodiments, sole 100 can minimize the weight of an article of footwear; control the flexion, resilience, and support of the article of footwear; and provide customized desired cushioning and shape for an article of footwear.

FIG. 1 illustrates a top view of sole 100 for an article of footwear 10, according to an embodiment. Similarly, FIG. 3 illustrates a perspective view of sole 100, according to an embodiment. Sole 100 can include forefoot area 110, midfoot area 120, and rearfoot area 130. Sole 100 can include medial side 140, lateral side 150, top surface 160, and bottom surface 170 (see FIGS. 2 and 3).

In certain embodiments, sole 100 can be formed from one or more extruded member 200. In certain embodiments, extruded member 200 can be a solid material. In certain embodiments, extruded member 200 can be a hollow tube. In certain embodiments, extruded member 200 can be a foam or cellular material, or any other suitable material. In certain embodiments, extruded member 200 can be a single, continuous piece of extruded material.

Extruded member 200 can be a porous or non-porous material. For example, extruded member 200 can be made of rubber, foam (e.g., dispensed urethane foam), silicone, plastic, thermoplastic (e.g., polyurethane, nylon, or polypropylene), or any other suitable material. In certain embodiments, extruded member 200 can be a composite or blended material, for example, but not limited to, rubber and cork, rubber and thermoplastic resin, microspheres added to a resin, glass or carbon fibers added to a resin, and/or nanoparticles. In certain embodiments, extruded member 200 can be an impregnated material. In certain embodiments, extruded member 200 can have a coating, for example, a sealant coating. Extruded member 200 can be a cured or uncured material or a reactive or non-reactive material.

Various physical properties of extruded member 200 may be varied to provide the desired characteristics of sole 100. Physical properties of extruded member 200 include, but are not limited to, thickness, color, density, material, shape, elasticity, etc. In certain embodiments, physical properties can be changed from a first layer to a second layer of extruded member 200. For example, one layer can be white and another layer can be blue. Physical properties can also be changed within a single layer. For example, a layer of extruded member 200 can be red in forefoot area 110, white in midfoot area 120, and blue in rearfoot area 130. Other physical properties can be similarly altered within a layer or from one layer to the next. For example, it may be beneficial for extruded member 200 to have a higher density in rearfoot area 130 to absorb impact to a wearer's heel. In certain embodiments, a bottom layer or layers of extruded member 200 can have a higher density to form an outsole, while an upper layer or layers can have a lower density to form a midsole.

In some embodiments, the thickness of extruded member 200 can be varied within a layer or from one layer to the next. In certain embodiments, the thickness can be varied by changing the extruder speed. For example, increasing the extruder speed can decrease the thickness of extruded member 200, and vice versa. The thickness of extruded member 200 can also be adjusted by increasing or decreasing the aperture size of the extruder nozzle. In certain embodiments, the extruder nozzle can be configured to change the size of the aperture without stopping the extruder.

Figure 27:
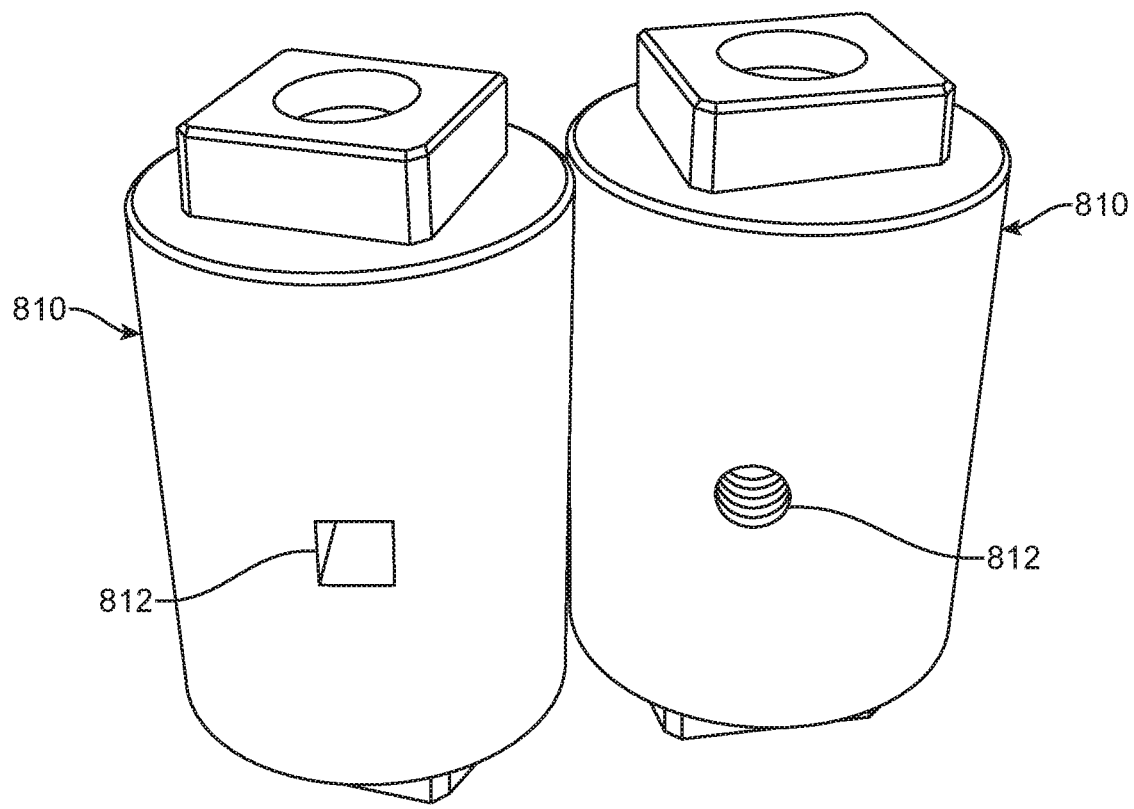
FIG. 27 illustrates extrusion nozzles according to embodiments presented herein.

The shape of extruded member 200 can also be changed within a layer or from one layer to the next, providing different cross-sections of extruded member 200. For example, as shown in FIG. 27, extruder nozzle 810 can have an aperture 812 that is round or square. Aperture 812 can be any other shape. In certain embodiments, the shape of extruded member 200 can be changed in real time, without having to stop the machine and change out the extruder nozzle 810. For example, extruder nozzle 810 can have multiple apertures 812 of different shapes and sizes that can be selectively opened or closed to change the shape or size of extruded member 200. This can allow sole 100 to be made from a single extruded member 200 having different cross-sections. Changing the shape of extruded member 200 can impart desired qualities, for example, a shape that provides improved cushioning, stability, or flexibility for an area of sole 100.

In some embodiments, the size of the extruder nozzle aperture 812 may be dynamically adjusted in real time during an extrusion process based on data received from a sensor operatively connected to the extruder. The data may include, but is not limited to, temperature, viscosity, and/or density of the extrusion material or substrate receiving the extrusion material, temperature of extruder components, such as, for example, the nozzle and the extrusion surface, and time. By way of example, referring to FIG. 24, sensor 700 can receive the data. In certain embodiments, the sensor can send the data to computer 702. Computer 702 can have a processor, memory, etc., and be configured to carry out instructions from a tangible computer readable medium. Extruder 704 can operate based on instructions from computer 702.

In certain embodiments, extruded member 200 can be a co-extruded member. That is, a first material can be encapsulated within a second material. This can provide an aesthetically pleasing material that encapsulates a functional material. In certain embodiments, a soft, cushioning material can be encapsulated within a stiff, durable material, or vice versa. In one embodiment, a first material may be encapsulated with a material having a lower hardness or stiffness. For example, where one or more extruded members 200 are used to provide a footwear upper, an extruded member 200 providing a collar portion of the upper, which may require stiffness for support but also cushioning to prevent irritation, may be co-extruded with first and second materials.

Sole 100 can be formed by extruding extruded member 200 in a controlled geometric pattern. In certain embodiments, the pattern can be a non-woven pattern. In certain embodiments, the controlled geometric pattern can be created using computer-aided design (CAD) or other computer design software. In certain embodiments, computerized numerical control (CNC) can be used to control an extruder (e.g., a three-axis pneumatic extruder) in order to form a precise (i.e., non-random) pattern for sole 100. Variables such as, but not limited to, the size and shape of the dispensing orifice (i.e., extrusion die), dispensing pressure, dispensing temperature, dispensing viscosity, dispensing height, table axis and table speed can be adjusted to create the desired pattern.

Figure 4:
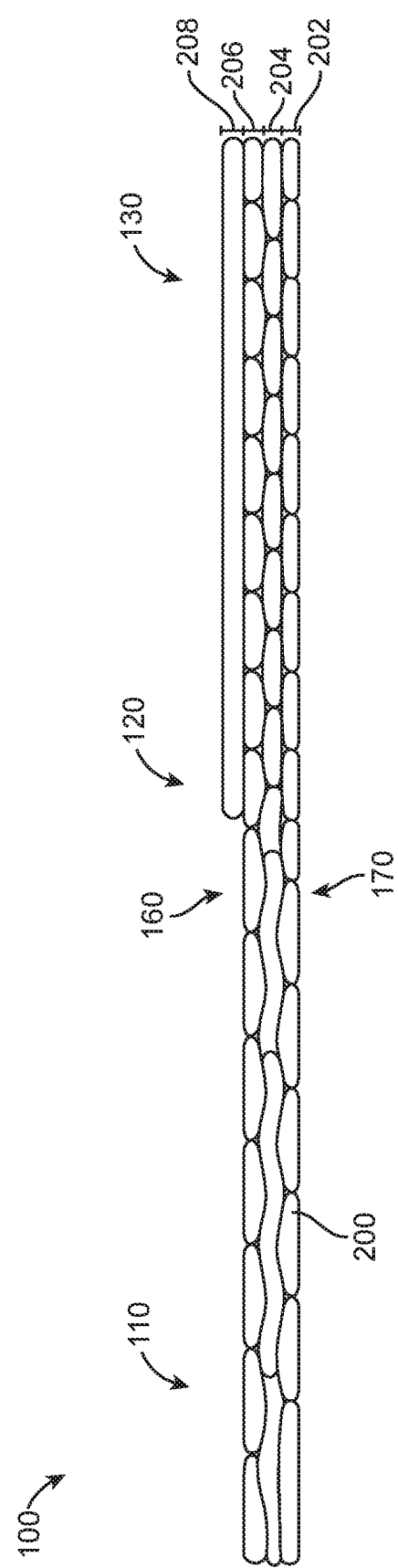
FIG. 4 illustrates a lateral side view of a sole for an article of footwear according to an embodiment presented herein.

In certain embodiments, extruded member 200 can be formed into a plurality of layers to create sole 100. For example, extruded member 200 can be formed into first layer 202, second layer 204, third layer 206, and fourth layer 208, as illustrated in FIG. 4. In certain embodiments, the plurality of layers can be formed from a single, continuous extruded member 200. In certain embodiments, each layer can be a separate extruded member 200. In certain embodiments, each layer can include more than one extruded member 200. In certain embodiments, at least a portion of two layers can be formed from the same extruded member 200. Each layer can be positioned directly on top of a preceding layer, or layers can be formed at an angle with respect to a preceding layer.

In one embodiment, certain areas of sole 100 can include one or more additional layers of extruded member 200 relative to other areas of sole 100. In some embodiments, this can provide additional cushioning or support at targeted areas of sole 100 in order to maximize comfort and performance of the article of footwear. For example, rearfoot area 130 can have one or more additional layers of extruded member 200 to absorb impact to the wearer's heel. In certain embodiments, the additional layer or layers can be shaped to form coil 220 in rearfoot area 130, as illustrated in FIG. 1. Other shapes, including, for example, but not limited to, circles, ovals, and spirals can be formed from extruded member 200 to provide similar benefits as coil 220.

Other areas of sole 100 can include one or more additional layers of extruded member 200. In certain embodiments, forefoot area 110 can include one or more additional layers of extruded member 200 to absorb impact at the ball of the foot. For example, a spiral pattern can be formed where the ball of the foot would be located, and/or under each individual toe. In certain embodiments, one or more additional layers can be included in midfoot area 120 to provide support for the arch of the foot. In certain embodiments, one or more additional layers can be located along all or part of medial side 140 and/or lateral side 150 to provide stability.

Figure 2:
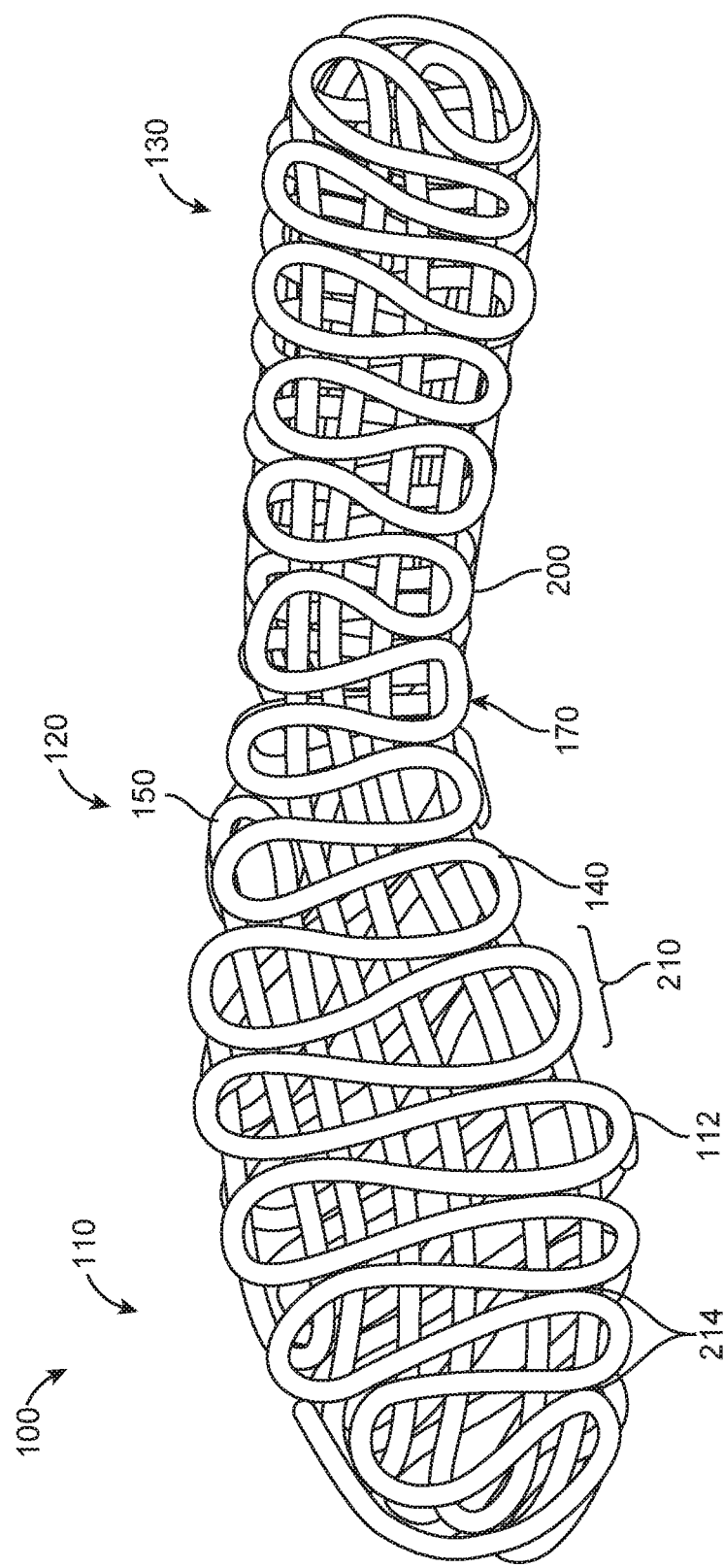
FIG. 2 illustrates a bottom view of a sole for an article of footwear according to an embodiment presented herein.
Figure 3:
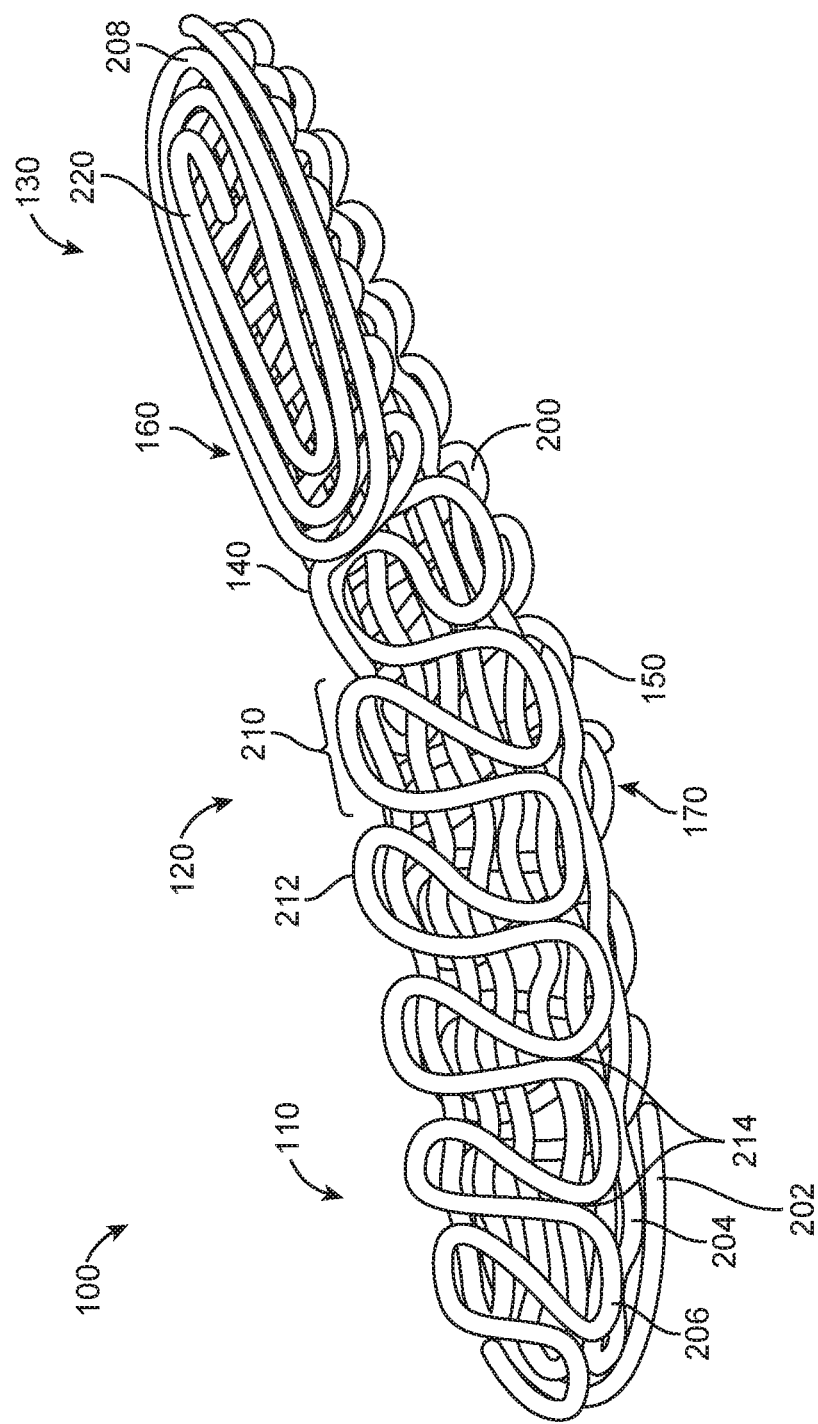
FIG. 3 illustrates a perspective view of a sole for an article of footwear according to an embodiment presented herein.

FIG. 2 illustrates a bottom view of sole 100 for an article of footwear, according to an embodiment. Bottom surface 170 of extruded member 200 can have the same or different geometric pattern or design as top surface 160 shown in FIG. 1. In certain embodiments, extruded member 200 can be formed to have a plurality of undulations 210 extending in a generally transverse direction across forefoot area 110, midfoot area 120, and/or rearfoot area 130. In certain embodiments, extruded member 200 can be formed to run lengthwise from forefoot area 110 to rearfoot area 130, or at an angle with respect to the lengthwise direction.

With reference to FIGS. 1 and 2, for example, in certain embodiments, extruded member 200 can be disposed such that adjacent portions run in opposite directions (i.e., "double back") along a direction of sole 100 (e.g., a transverse direction), forming undulations 210 that can extend from medial side 140 to lateral side 150 of sole 100. In certain embodiments, undulations 210 can extend only partially across sole 100 such that they do not extend entirely from medial side 140 to lateral side 150.

As shown, for example, in FIG. 2, in certain embodiments, each undulation 210 can form a loop 212 as it doubles back across sole 100. In certain embodiments, loop 212 can contact an adjacent loop 212 at one or more contact point 214. In certain embodiments, undulations 210 can be spaced such that loops 212 do not contact an adjacent loop 212 (see FIG. 10). In certain embodiments, each undulation 210 can contact an adjacent undulation 210 along its entire length such that no gaps are formed between the material of extruded member 200 as it doubles back while spanning from medial side 140 to lateral side 150 (or along the length of sole 100). Undulations 210 can also run in the lengthwise direction, or at an angle with respect to the lengthwise direction.

In certain embodiments, the size and/or shape of loops 212 can vary. For example, loops 212 can be smaller near a front portion of forefoot area 110 and larger as they approach midfoot area 120. In certain embodiment, loops 212 can have curved ends along medial side 140 and lateral side 150. In certain embodiments, loops 212 can have flat or angled ends along medial side 140 and lateral side 150. Other shapes and designs for undulations 210 are contemplated. For example, undulations 210 can be shaped like a waveform (e.g., sinusoidal, sawtooth, square, triangle, etc.). Undulations 210 can be uniform or non-uniform. In certain embodiments, the general shape of undulations 210 can be consistent along the length of sole 100, but the amplitude of undulations 210 can vary between medial side 140 and lateral side 150 and along forefoot area 110, midfoot area 120, and rearfoot area 130 of sole 100. In certain embodiments, the shape of undulations 210 can change along the length of sole 100.

Many other patterns, shapes, and designs for extruded member 200 are contemplated including those that are difficult to produce using conventional molding techniques. For example, some non-limiting patterns of extruded member 200 include zigzags, swirls, spirals, lines, coils, circles, dots, cross-hatching, beading, concentric shapes, letters, moiré patterns, fractal shapes, pillars, piles, blocks, balls, and/or logos. These patterns can be uniform or non-uniform. In certain embodiments, adjacent portions of extruded member 200 can contact each other such that when extruded member 200 cools, extruded member 200 has the appearance of a single, solid piece of material. In certain embodiments, more than one pattern can be formed within a single layer. For example, forefoot area 110 can have a cross-hatch pattern, midfoot area 120 can have a zigzag pattern, and rearfoot area 130 can have a spiral pattern.

FIG. 4 illustrates a lateral side view of sole 100, according to an embodiment. As explained above, in certain embodiments, extruded member 200 can have a plurality of layers. For example, as shown in FIG. 4, extruded member 200 can have first layer 202, second layer 204, third layer 206, and fourth layer 208. In certain embodiments, each layer can be planar, such that the layer is the thickness of extruded member 200. In certain embodiments, extruded member 200 can be a single strand of material formed into multiple layers. In certain embodiments, each layer can comprise a single extruded member 200. In certain embodiments, multiple extruded members 200 can make up a single layer. Each layer can have the same or different pattern. In certain embodiments, particular areas of sole 100 can include more layers than others. For example, in certain embodiments, rearfoot area 130 can include one or more additional layers of extruded member 200. Additional layers can be included in any part of sole 100.

Figure 5:
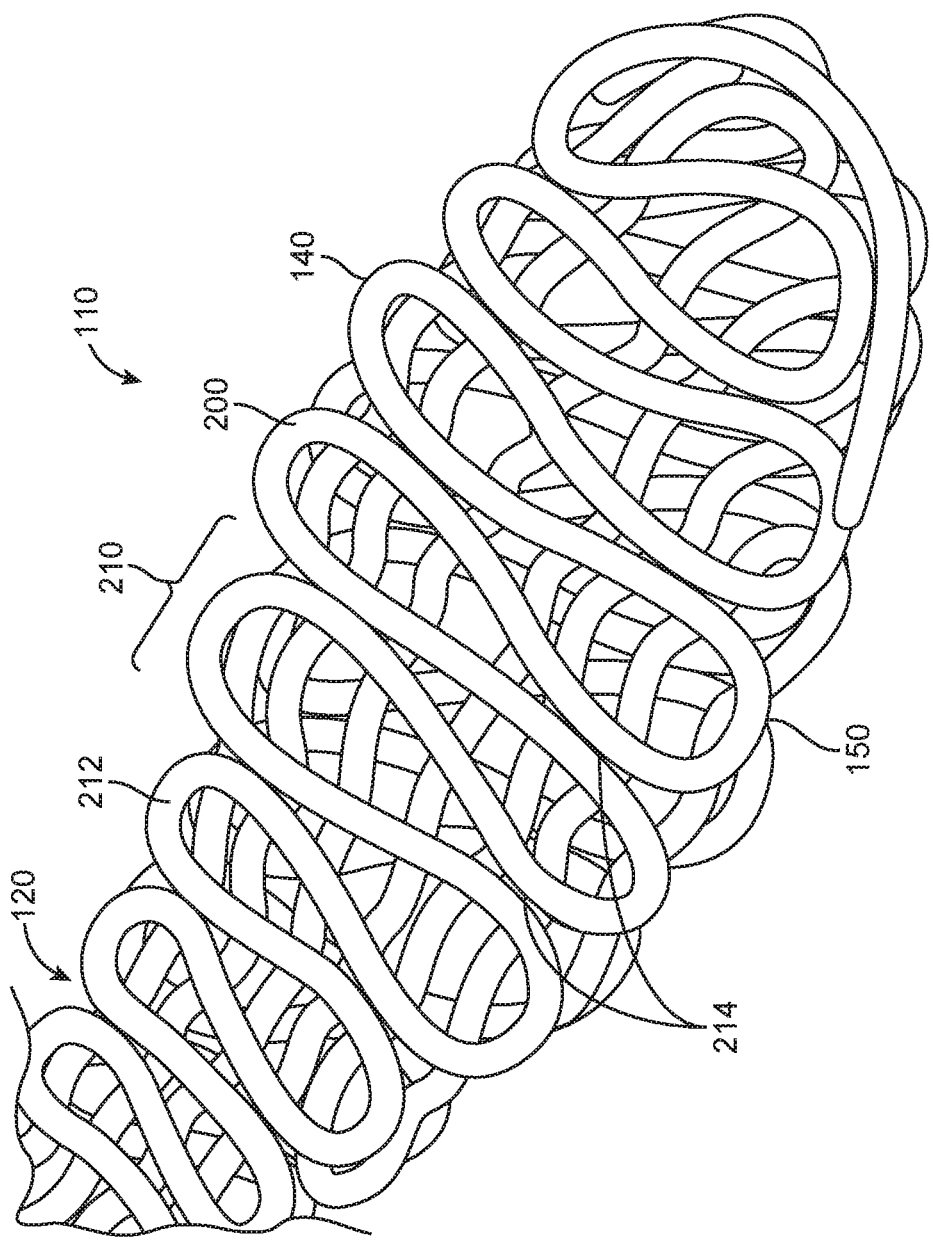
FIG. 5 illustrates a forefoot area of a sole for an article of footwear according to an embodiment presented herein.
Figure 6:
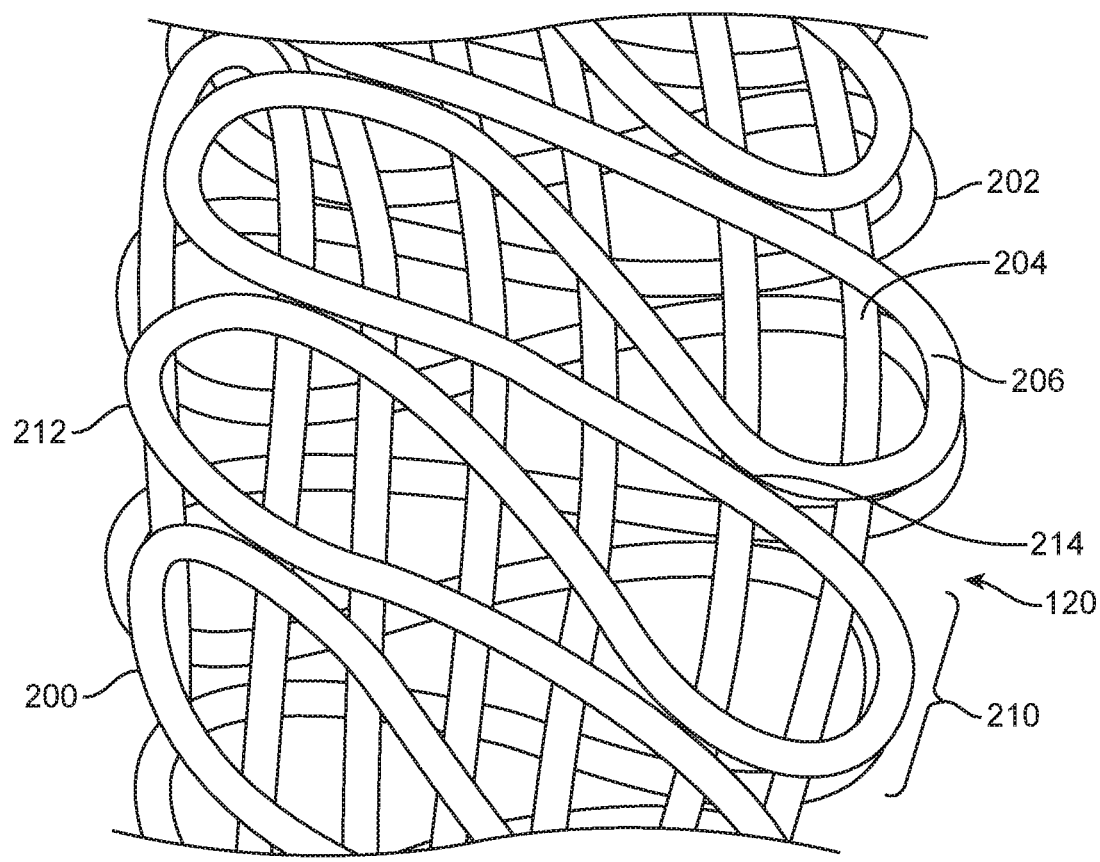
FIG. 6 illustrates a partial enlarged view of a sole for an article of footwear according to an embodiment presented herein.

FIG. 5 illustrates forefoot area 110, according to an embodiment. FIG. 6 illustrates midfoot area 120, according to an embodiment. As shown, for example, in FIGS. 5 and 6, the pattern for extruded member 200 can be different along the length of sole 100, between each layer, and in certain key locations of sole 100. For example, in certain embodiments, first layer 202 and third layer 206 of extruded member 200 can have undulations 210 forming loops 212 which can extend from medial side 140 to lateral side 150 of sole 100. In certain embodiments, second layer 204 of extruded member 200 can extend in a generally lengthwise direction of sole 100. In certain embodiments, second layer 204 can be generally perpendicular to first layer 202 and third layer 206, which can be formed in a transverse direction of sole 100. In certain embodiments, each of the layers can be formed at an angle with respect to a lengthwise or a transverse direction of sole 100. In certain embodiments, the pattern or direction of extruded member 200 can change along the length or width of sole 100. For example, within a single layer, extruded member 200 can run in a lengthwise direction in forefoot area 110, an angled direction in midfoot area 120, and a transverse direction in rearfoot area 130.

Figure 7:
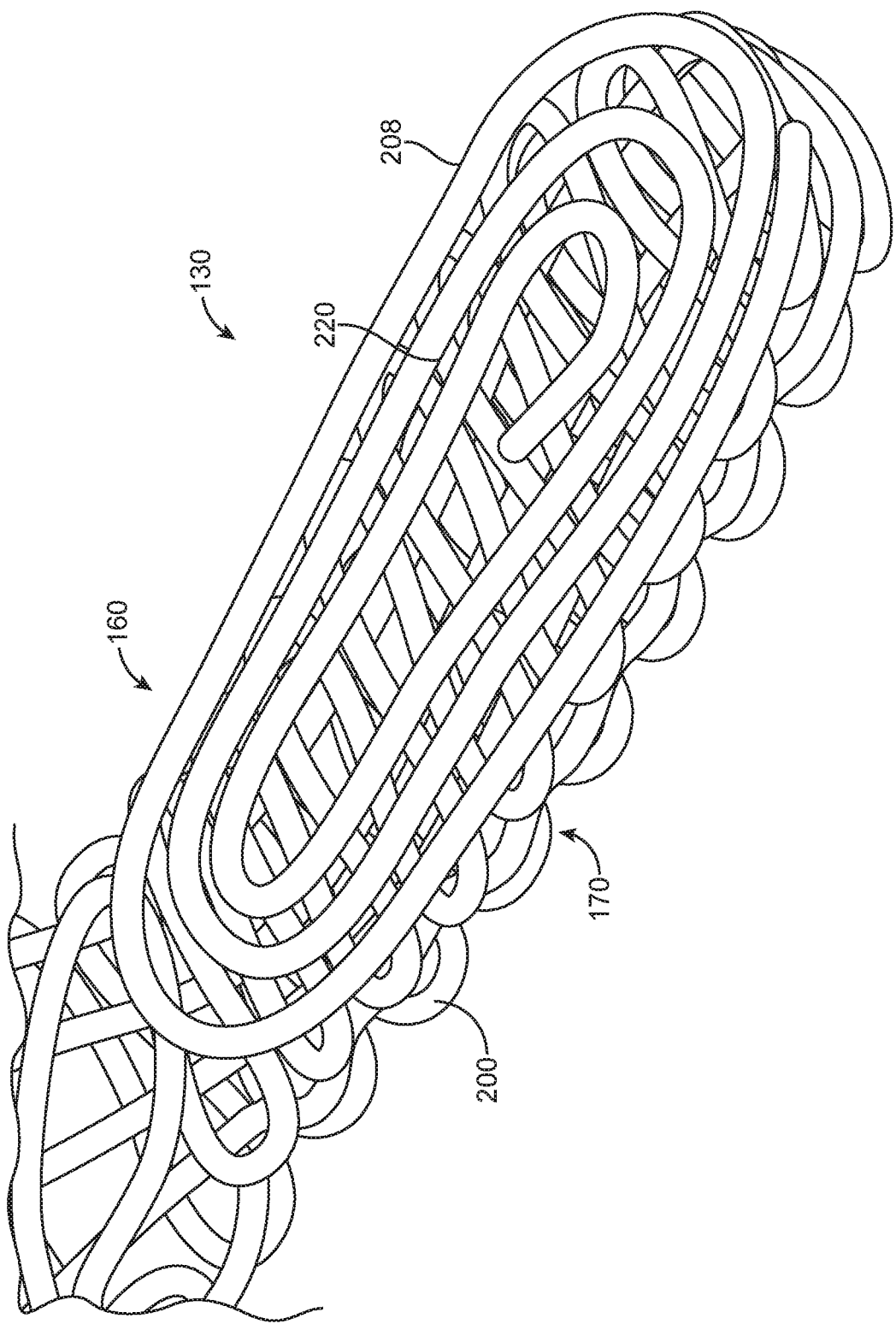
FIG. 7 illustrates a top perspective view of a rearfoot area of a sole for an article of footwear according to an embodiment presented herein.

FIG. 7 illustrates a top view of rearfoot area 130, according to an embodiment. As shown in FIG. 7, in certain embodiments, rearfoot area 130 can include one or more additional layers of extruded member 200. In certain embodiments, extruded member 200 can be formed as coil 220. Other shapes and designs for coil 220 are contemplated, for example, a spiral pattern to accommodate a heel of the wearer.

Figure 8:
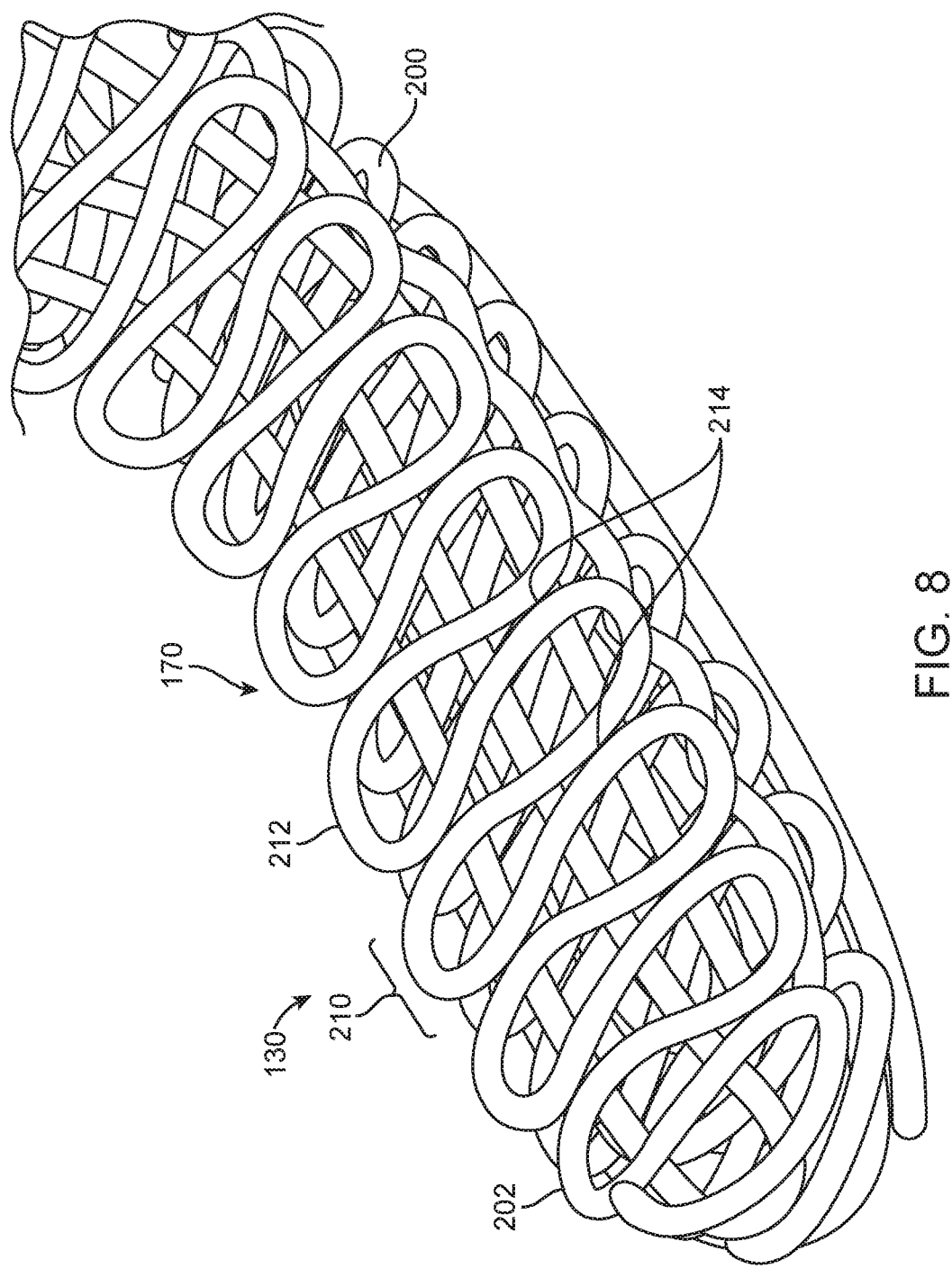
FIG. 8 illustrates a bottom perspective view of a rearfoot area of a sole for an article of footwear according to an embodiment presented herein.

FIG. 8 illustrates a bottom view of rearfoot area 130, according to an embodiment. As shown in FIG. 8, bottom surface 170 of rearfoot area 130 can be formed with a different pattern than top surface 160 illustrated in FIG. 7. In certain embodiments, first layer 202 of extruded member 200 can include undulations 210 having loops 212, which can contact an adjacent loop 212 at one or more contact point 214. In certain embodiments, adjacent loops 212 can contact each other along a majority of the length of each loop 212.

Figure 9:
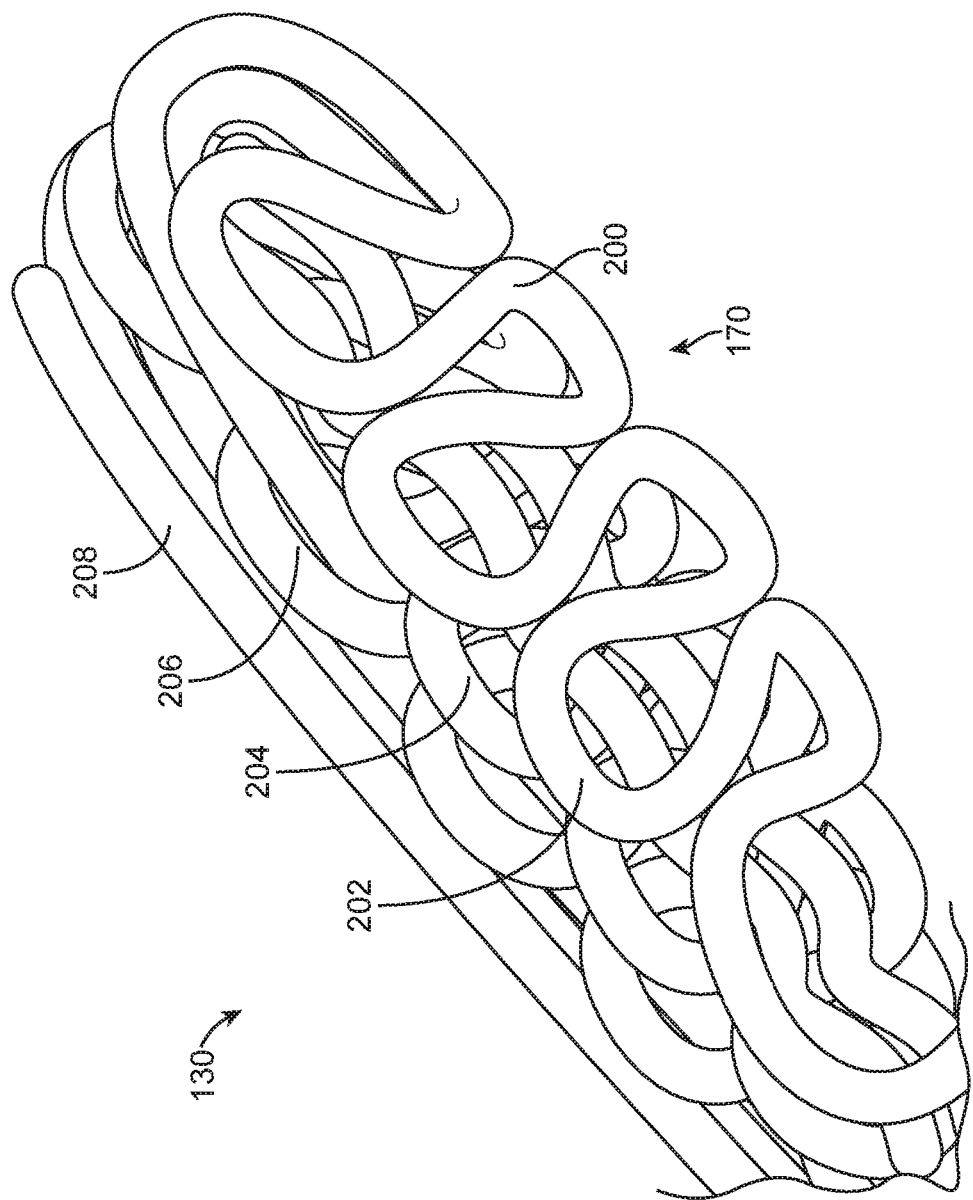
FIG. 9 illustrates a perspective view of a rearfoot area of a sole for an article of footwear according to an embodiment presented herein.

FIG. 9 illustrates a perspective view of rearfoot area 130, according to an embodiment. In certain embodiments, extruded member 200 can include first layer 202, second layer 204, third layer 206, and fourth layer 208. These layers can have the same or different design patterns. In certain embodiments, loops 212 of first layer 202 can be offset from loops 212 of second layer 204. In other embodiments, loops 212 of different layers can be directly on top of each other.

Figure 10:
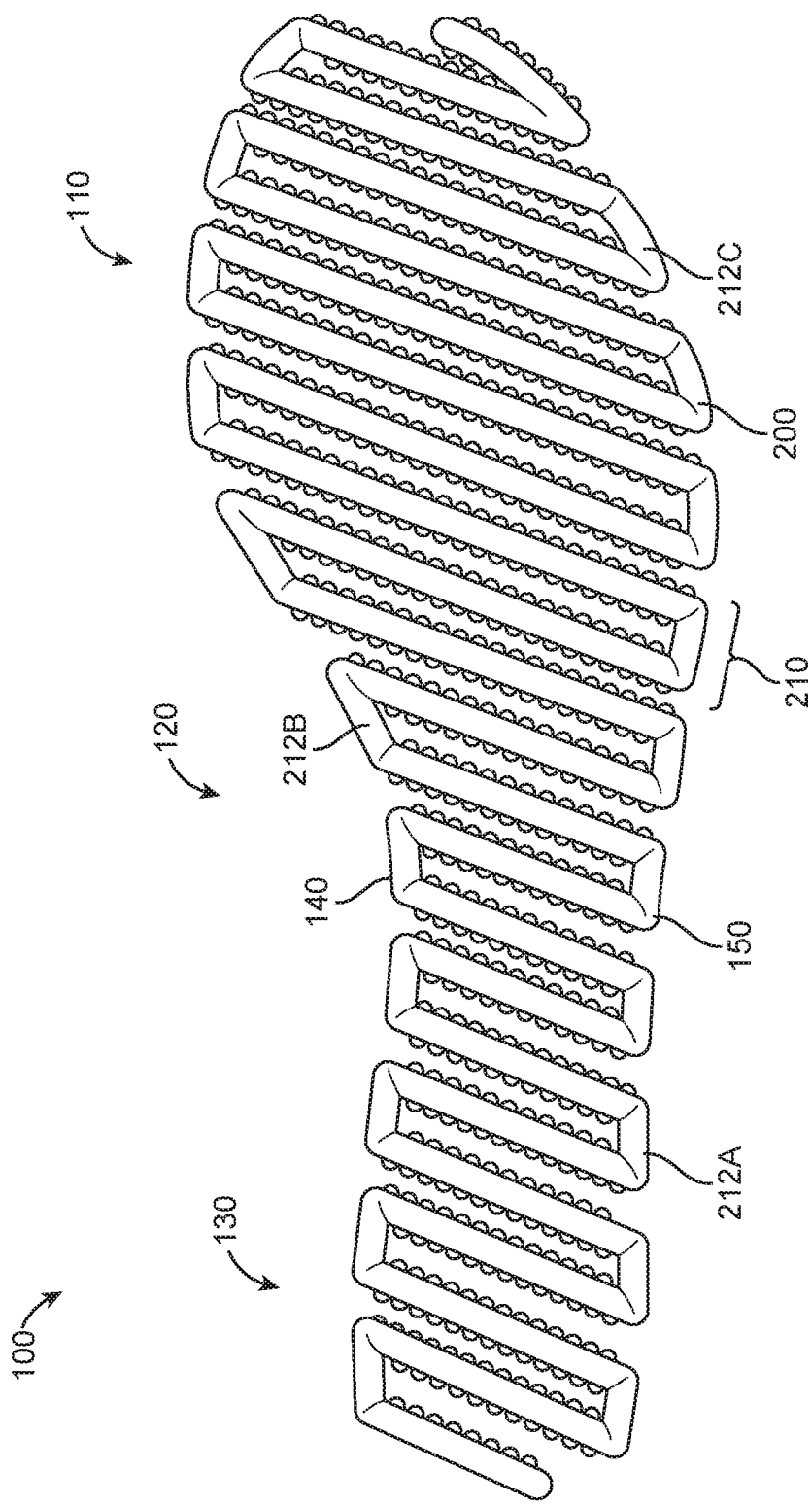
FIG. 10 illustrates a top view of a sole for an article of footwear according to an embodiment presented herein.
Figure 11:
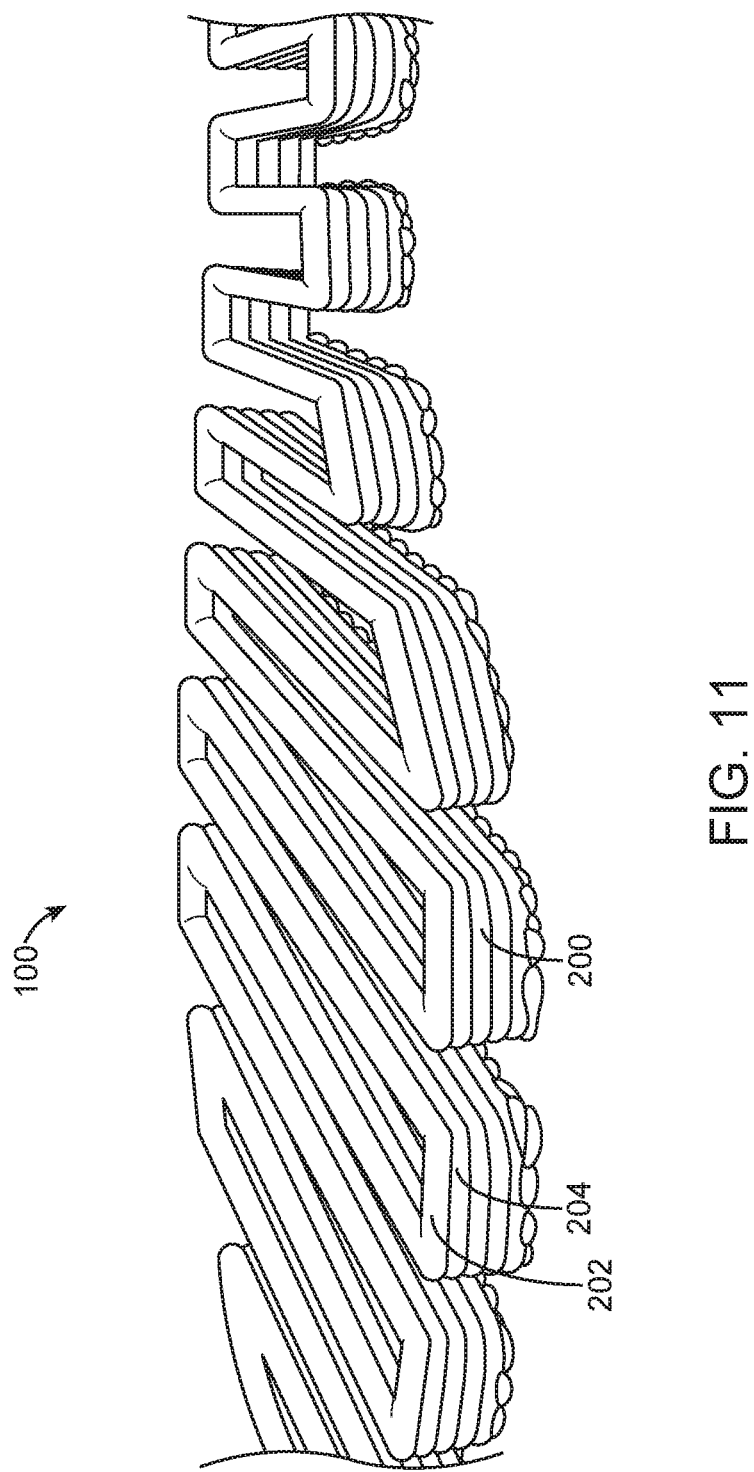
FIG. 11 illustrates a side view of the sole of FIG. 10 according to an embodiment presented herein.

With reference to FIGS. 10 and 11, for example, in certain embodiments, sole 100 can include extruded member 200 having a generally uniform pattern, in that the layers (e.g., layer 202 and layer 204) of extruded member 200 forming sole 100 are substantially directly on top of each other (see FIG. 11). Undulations 210 can be spaced relatively equally apart or the distance between undulations 210 can vary, with the amplitude varying along forefoot area 110, midfoot area 120, and rearfoot area 130. Loops 212A, 212B, 212C can be spaced so as not to contact adjacent loops 212. Some loops 212 can be generally flat along medial side 140 and lateral side 150, for example, loops 212A in rearfoot area 130. Other loops 212B and 212C can be angled along medial side 140 and lateral side 150, respectively. In one embodiment, adjacent layers 202 and 204 can be disposed progressively inward or outward on top of a lower layer such that sole 100 has a tiered or terraced structure.

Figure 12:
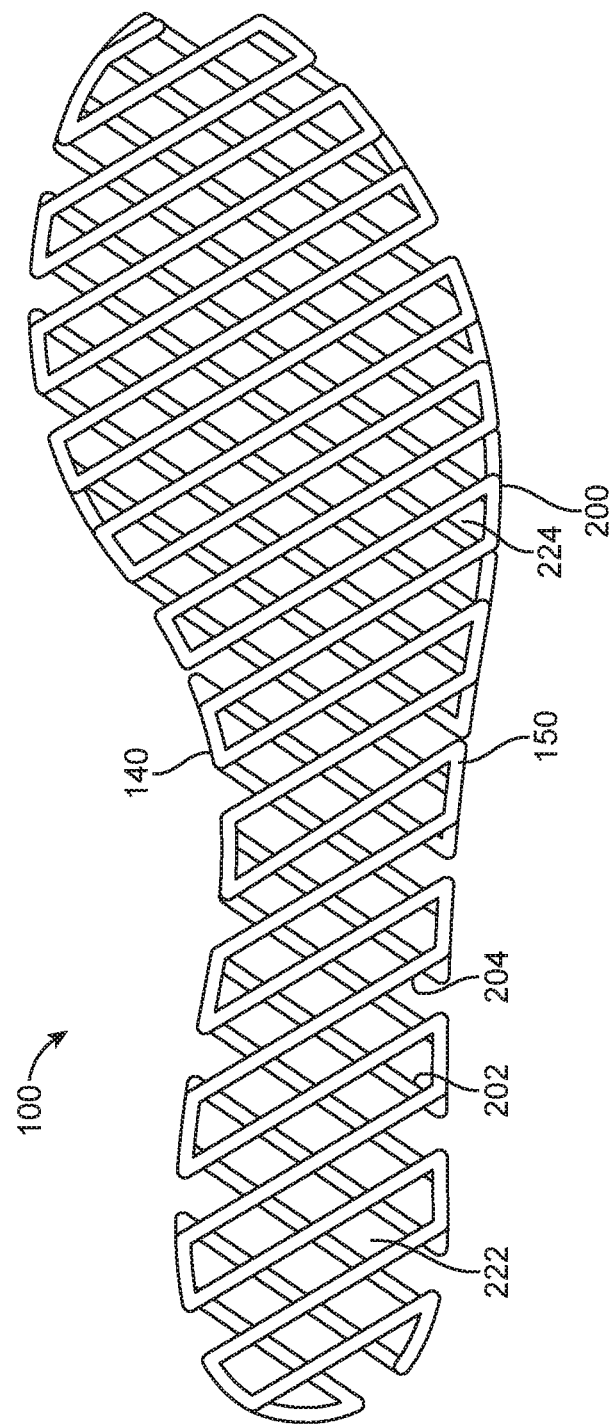
FIG. 12 illustrates a top view of a sole for an article of footwear according to an embodiment presented herein.

FIG. 12 illustrates a top view of sole 100, according to an embodiment. FIG. 12 illustrates extruded member 200 formed in a cross-hatch pattern. First layer 202 can be oriented in a first direction extending from medial side 140 to lateral side 150. Second layer 204 can be oriented in a second direction extending from medial side 140 to lateral side 150. In one embodiment, the cross-hatch pattern can form diamond-shaped gaps 222 and/or triangular gaps 224 in sole 100. Gaps can also be formed as other shapes (e.g., square, circle, etc.).

Figure 30:
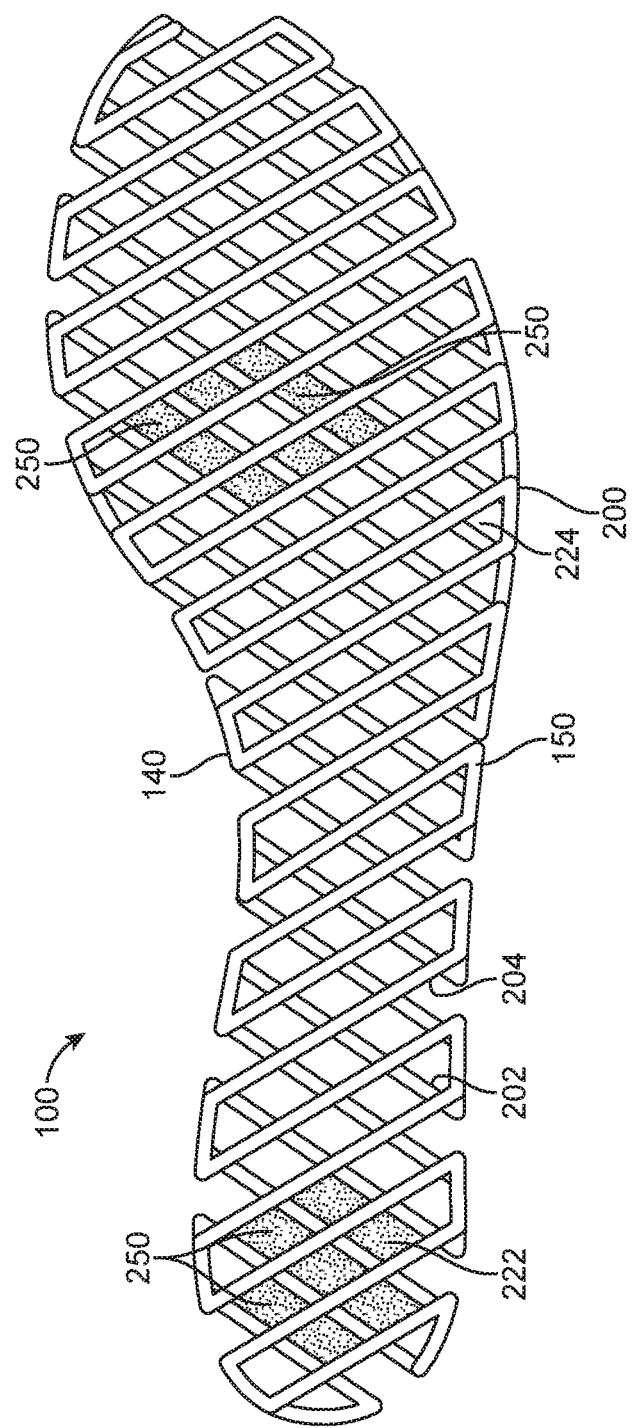
FIG. 30 illustrates a sole for an article of footwear according to an embodiment presented herein.

As shown in FIG. 30, in certain embodiments, the gaps can be selectively filled with similar or different material than extruded member 200 to form cells 250. For example, a foam material can fill particular gaps created between portions of extruded member 200. In certain embodiments, the same or different material can be extruded to fill gaps. Pre-formed inserts can also be inserted to fill the gaps. Cells 250 can be located in selected areas, for example, a heel strike area or an area under the ball of the foot. This can improve cushioning and shock absorption, and the overall weight of the footwear. In some embodiments, cells 250 located along a sidewall of the sole may be filled with a material to provide increased stability. It is contemplated that gaps in any of the embodiments described herein can be filled in a similar manner.

As shown in FIG. 12, first layer 202 and second layer 204 can be oriented at an angle with respect to the lengthwise direction of sole 100. First layer 202 and second layer 204 can be oriented at any angle, including parallel or perpendicular angles. In certain embodiments, the "tightness" (i.e., size of the gaps) of the cross-hatch can vary within a layer or between layers. The angle can be changed along the length of sole 100 such that, for example, the extruded member 200 runs at different angles in a forefoot portion, midfoot portion, and/or rearfoot portion of sole 100.

In one embodiment, sole 100 may include one or more extruded members 200 comprising a weave pattern. For example, a sole such as the one in FIG. 12 can be created by "weaving" two or more extruded members 200. To accomplish this, two or more extrusion nozzles can be operated at the same time and coordinated such that the extruded members 200 create a woven "over-under" pattern. In one embodiment, one or more members of the weave pattern may be made of different materials, which may provide improved cushioning and/or ride for the wearer.

Figure 13:
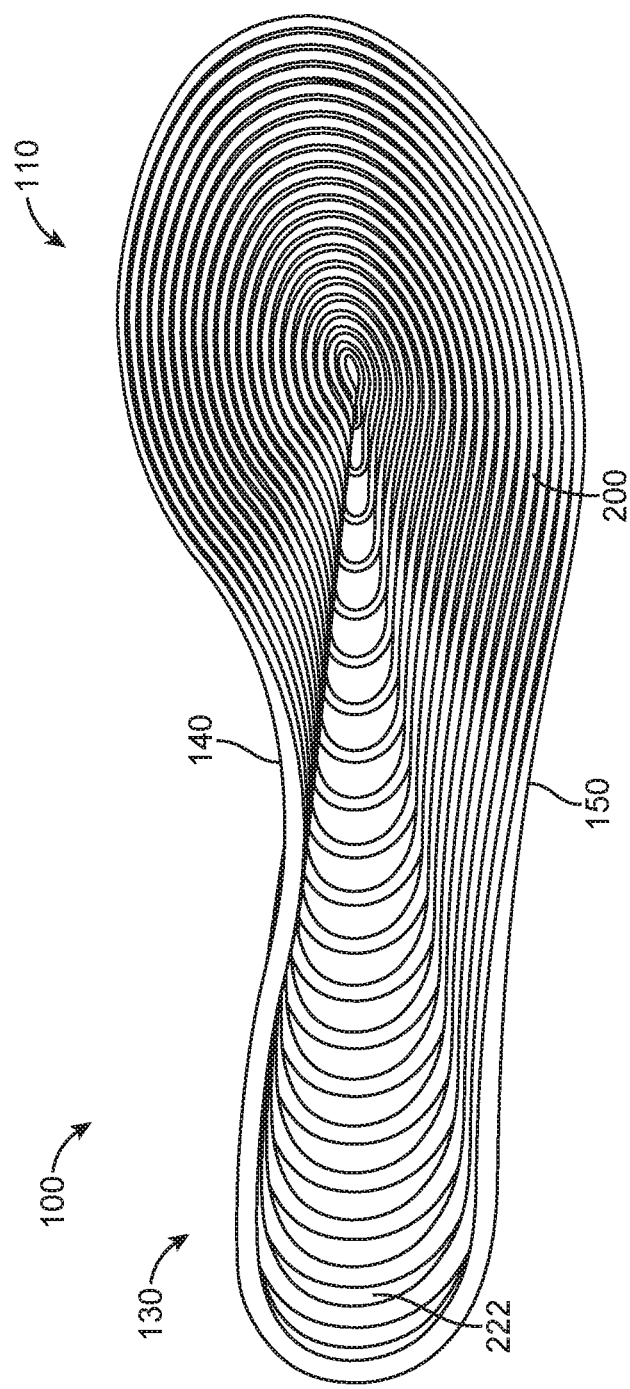
FIG. 13 illustrates a top view of a sole for an article of footwear according to an embodiment presented herein.
Figure 14:
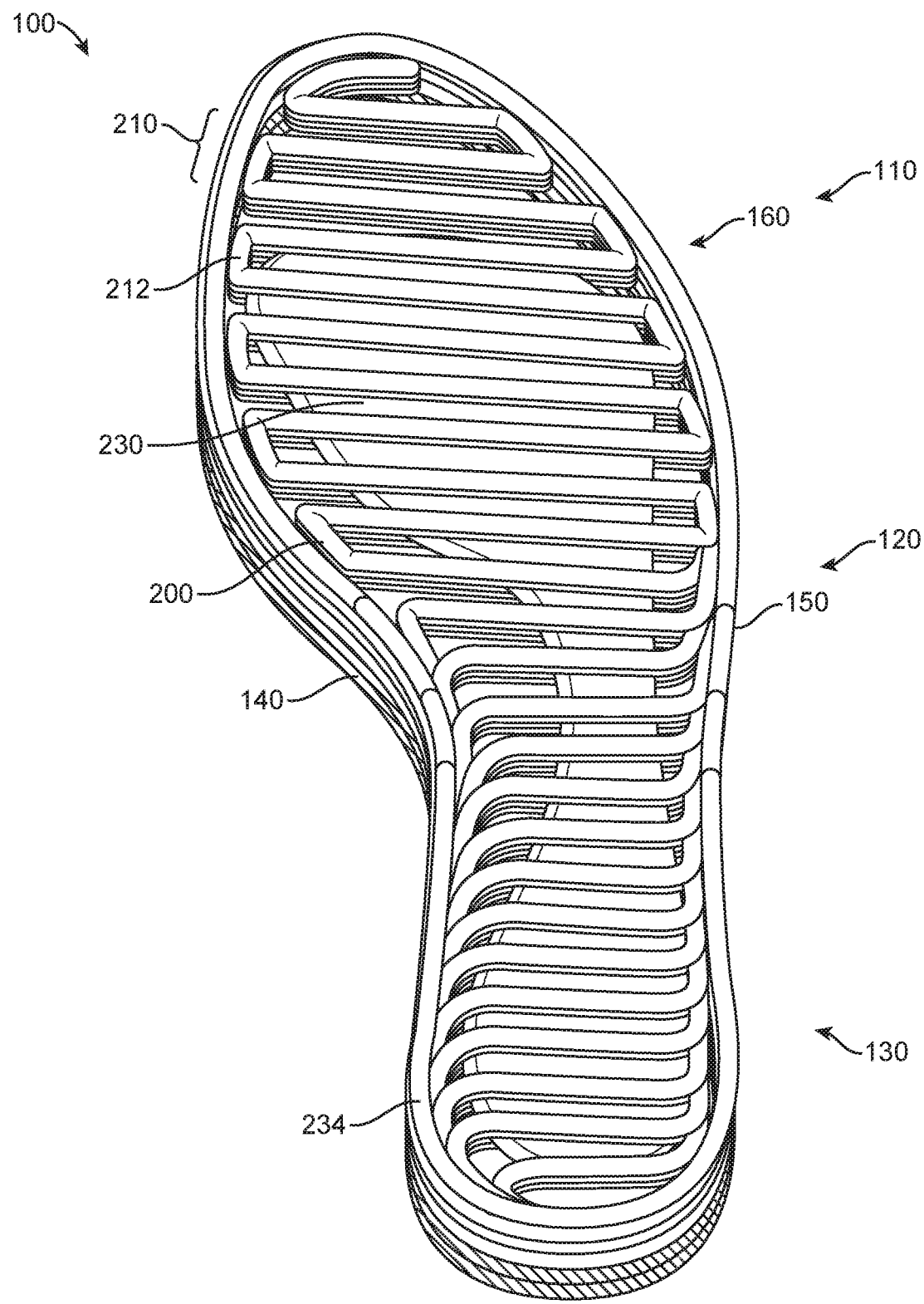
FIG. 14 illustrates a top view of a sole for an article of footwear according to an embodiment presented herein.
Figure 15:
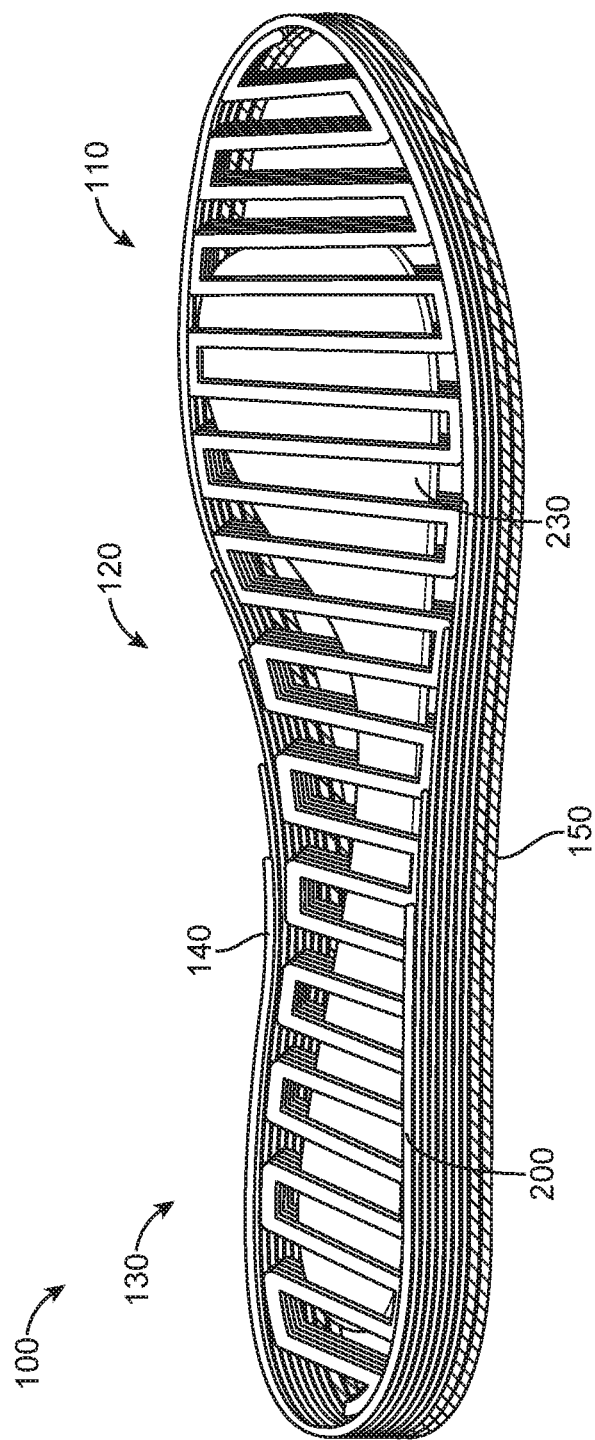
FIG. 15 illustrates a perspective view of a sole for an article of footwear according to an embodiment presented herein.

FIG. 13 illustrates a top view of sole 100, according to an embodiment. FIG. 13 illustrates a pattern, which in certain embodiments, can be formed by creating an outline of medial side 140 and lateral side 150 with extruded member 200 and then filling in an interior area of sole 100. In certain embodiments, the pattern can be formed with a continuous loop or spiral that starts at an interior location of sole 100 and goes outward, or that starts at an exterior location of sole 100 and goes inward. In certain embodiments, in forefoot area 110, each ring of extruded member 200 can contact an adjacent ring. In certain embodiments, for example as shown in rearfoot area 130, gaps 222 can be formed by spacing each ring of extruded member 200. In certain embodiments, in rearfoot area 130, each ring of extruded member 200 can contact an adjacent ring. In certain embodiments, in forefoot area 110, gaps 222 can be formed by spacing each ring of extruded member 200.

In certain embodiments, other features of articles of footwear can be incorporated into sole 100. For example, a bladder can be inserted between layers of extruded member 200. In certain embodiments, the bladder can be inserted between layers during the extrusion process. With reference to FIGS. 14-17, in certain embodiments, sole 100 can include intermediate sole 230. By way of example, in certain embodiments, intermediate sole 230 can be a bladder such as those disclosed in U.S. Pat. No. 5,771,606, which is incorporated herein by reference thereto in its entirety. In certain embodiments, intermediate sole 230 can be an inflatable bladder. In certain embodiments, intermediate sole 230 can be a rigid support member (e.g., plastic, metal, composite, etc.). In certain embodiments, intermediate sole 230 can be a cushioning material (e.g., foam, rubber, gel, etc.). In certain embodiments, intermediate sole 230 can be a foam insert. In certain embodiments, intermediate sole 230 can be a sealed or non-sealed container embedded at least partially within sole 100. In certain embodiments, intermediate sole 230 can be a temporary insert that can inserted and removed. In certain embodiments, a temporary insert can be used to form a void in sole 100. For example, the temporary insert can be heated or melted so that it can be removed from sole 100. For example, a temporary insert can be made of a malleable material (e.g., wax), sole 100 can be extruded around the temporary insert, and the temporary insert can be heated to remove it from sole 100, creating a void.

In certain embodiments, one or more intermediate sole 230 can be located along top surface 160, bottom surface 170, and/or in between layers of extruded member 200. Intermediate sole 230 can be located along the entire length of sole 100, or at any area along sole 100, for example, at rearfoot area 130, midfoot area 120, and/or forefoot area 110. For example, intermediate sole 230 shown in FIGS. 14-17 extends from rearfoot area 130, along midfoot area 120, and partially into forefoot area 110. In certain embodiments, the shape of intermediate sole 230 can vary along its length. For example, intermediate sole 230 can be wider in forefoot area 110 than in midfoot area 120. Intermediate sole 230 can extend entirely or partially between medial side 140 and lateral side 150.

In certain embodiments, extruded member 200 can be formed to at least partially cover intermediate sole 230. For example, intermediate sole 230 can be located between top surface 160 and bottom surface 170 of sole 100. In certain embodiments, intermediate sole 230 can be "sandwiched" between top surface 160 and bottom surface 170.

In certain embodiments, extruded member 200 can have undulations 210 with loops 212 such that intermediate sole 230 can be at least partially visible between undulations 210. In certain embodiments, extruded member 200 can entirely enclose intermediate sole 230 between one or more layers.

Figure 16:
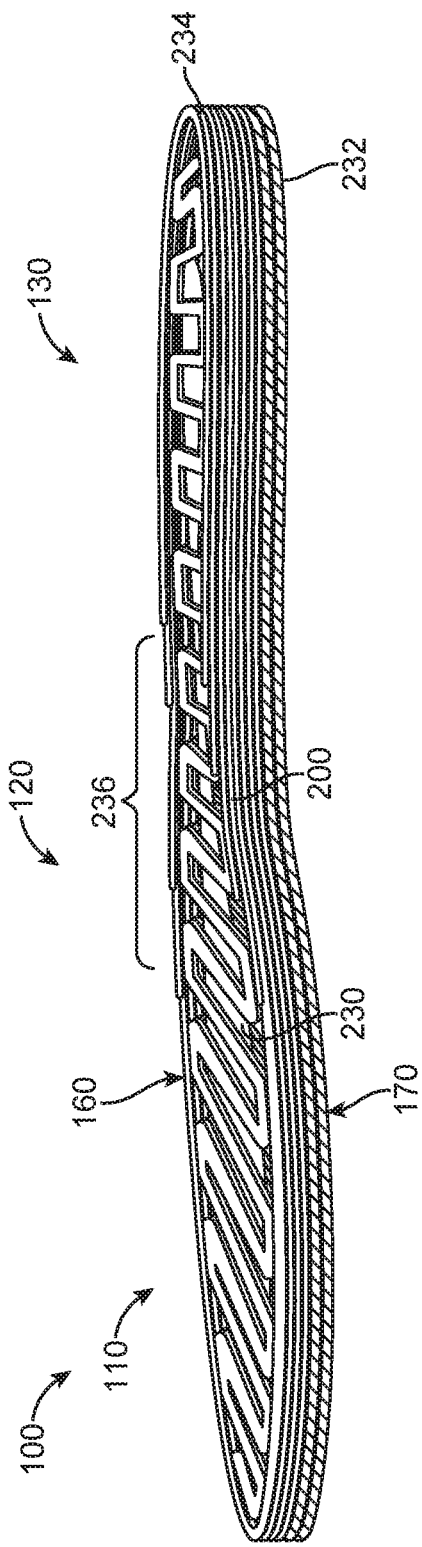
FIG. 16 illustrates a side view of a sole for an article of footwear according to an embodiment presented herein.

As shown, for example, in FIG. 16, in certain embodiments, intermediate sole 230 can be located between an outsole portion 232 and midsole portion 234 formed by one or more extruded members 200. In certain embodiments, extruded member 200 can be formed to create stepped region 236, which can have an increasing or decreasing number of layers along its length and/or width. For example, stepped region 236 can span midfoot area 120 and the number of layers can progressively decrease from the portion of stepped region 236 nearest rearfoot area 130 to forefoot area 110, as shown in FIG. 16.

Figure 17:
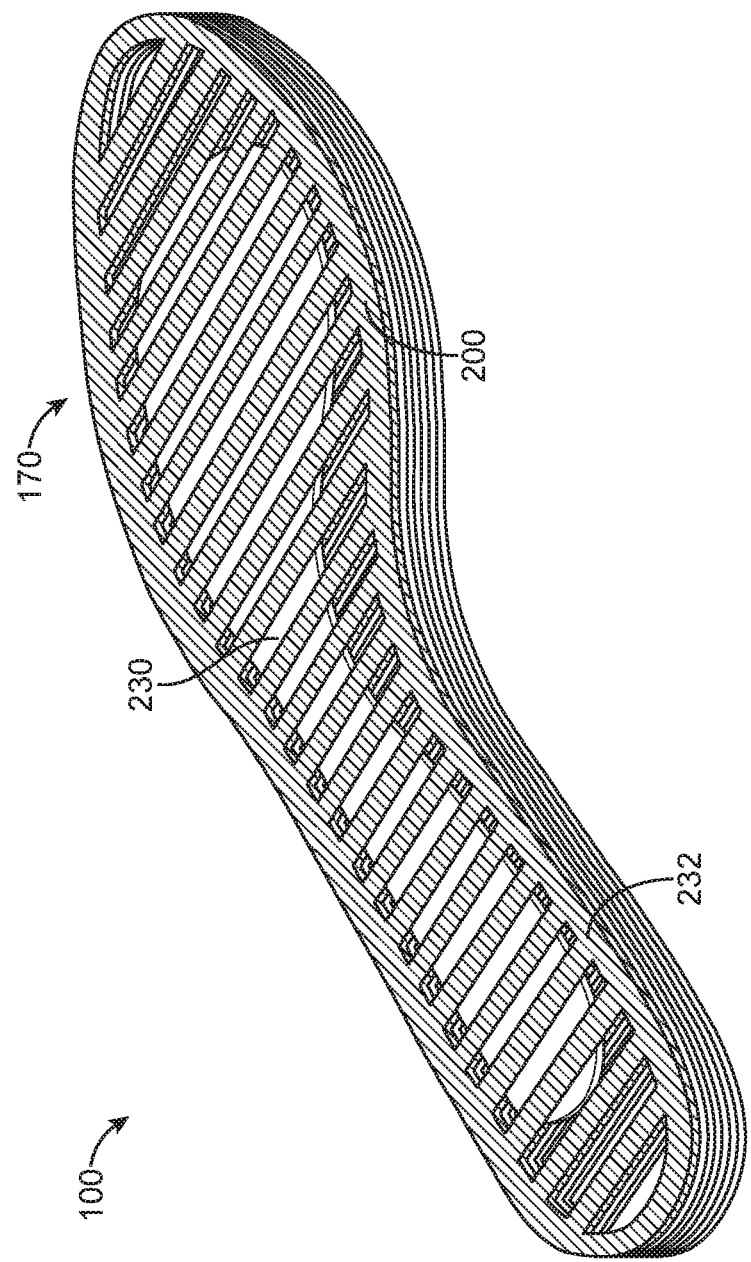
FIG. 17 illustrates a bottom view of a sole for an article of footwear according to an embodiment presented herein.

FIG. 17 illustrates a bottom view of sole 100, according to an embodiment. In certain embodiments, extruded member 200 can be formed to create bottom surface 170 of outsole portion 232. In certain embodiments, outsole portion 232 can be located beneath intermediate sole 230. Outsole portion 232 can be the same or different material as midsole portion 234 shown in FIGS. 14-16. Outsole portion 232 can have the same or different pattern as midsole portion 234. In certain embodiments, outsole portion 232 can have different physical properties than midsole portion 234.

Figure 18:
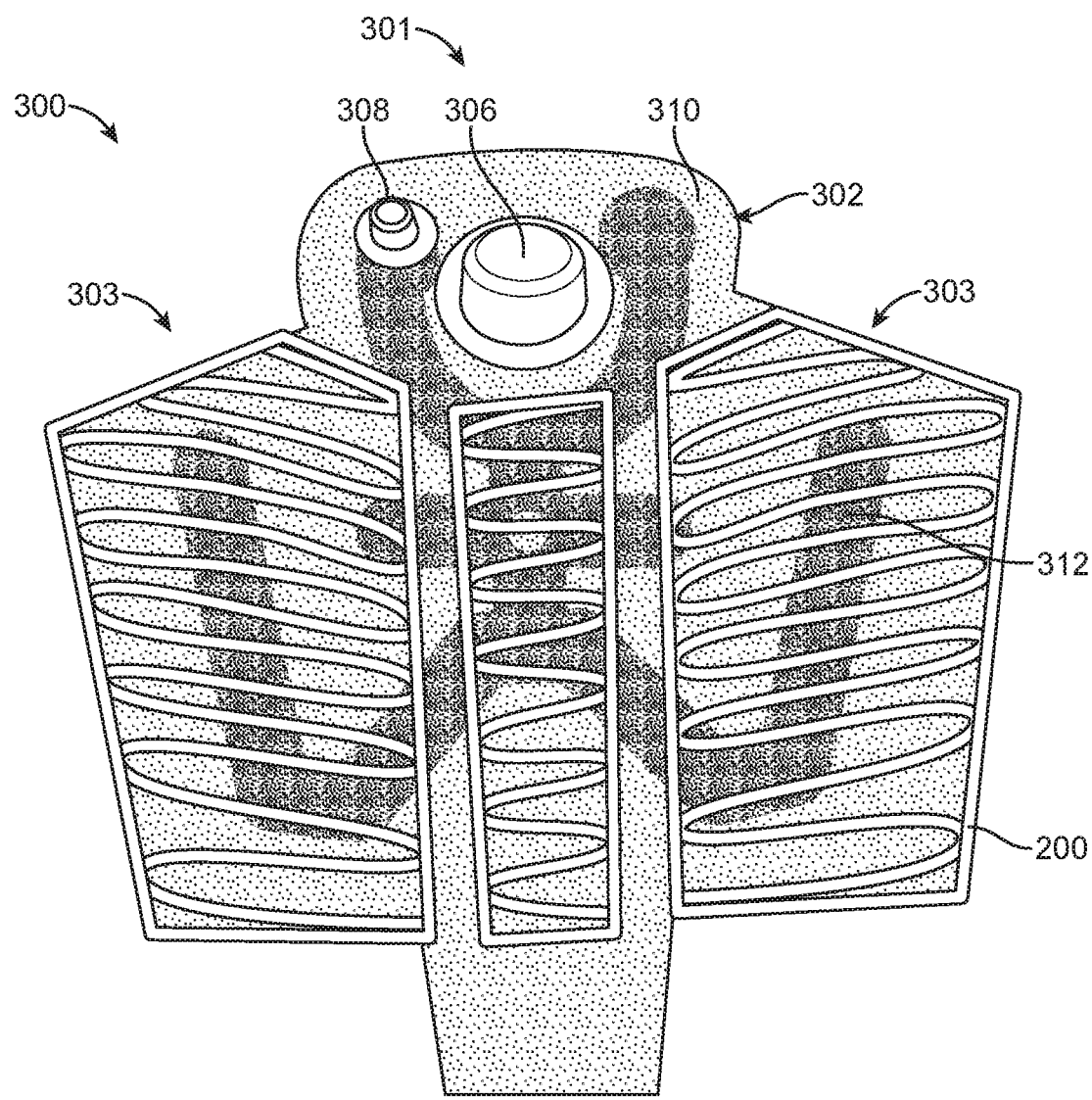
FIG. 18 illustrates a front view of a bladder according to an embodiment presented herein.
Figure 19:
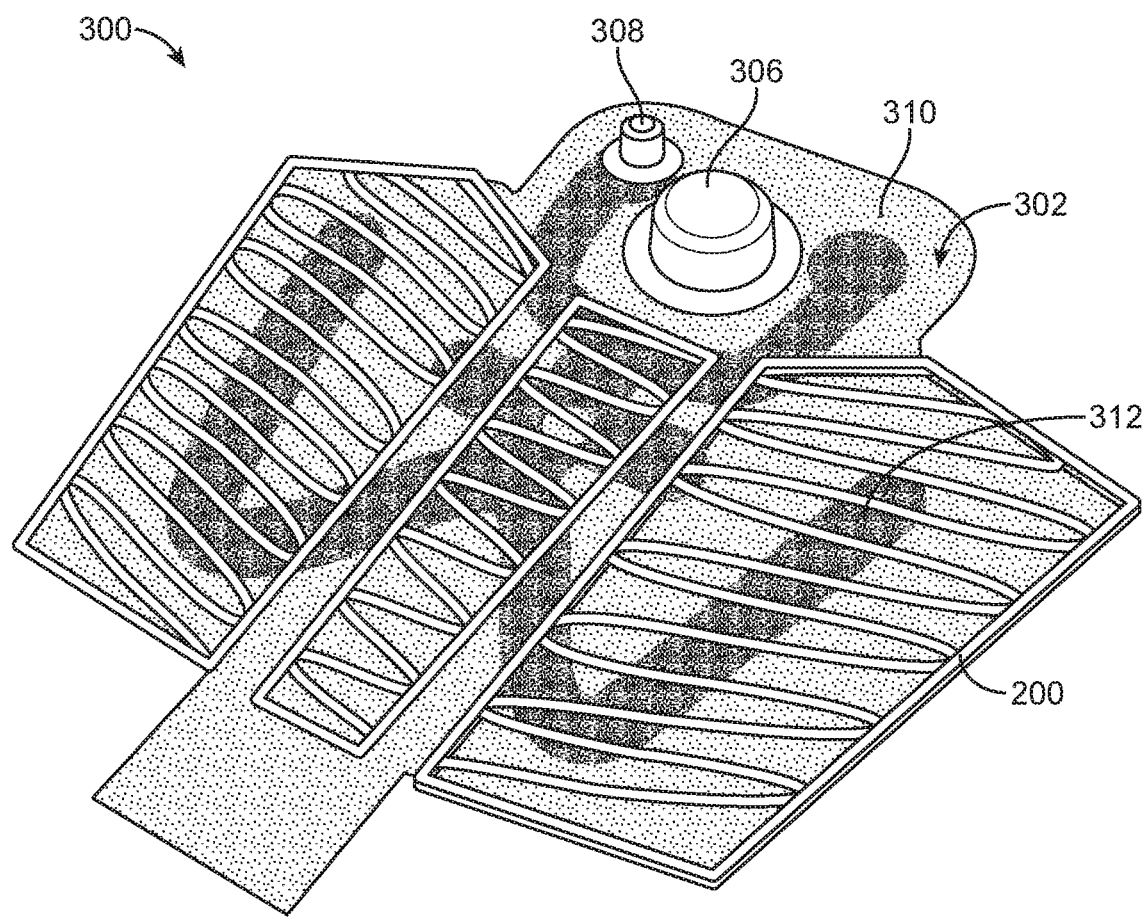
FIG. 19 illustrates a perspective view of a bladder according to an embodiment presented herein.
Figure 20:
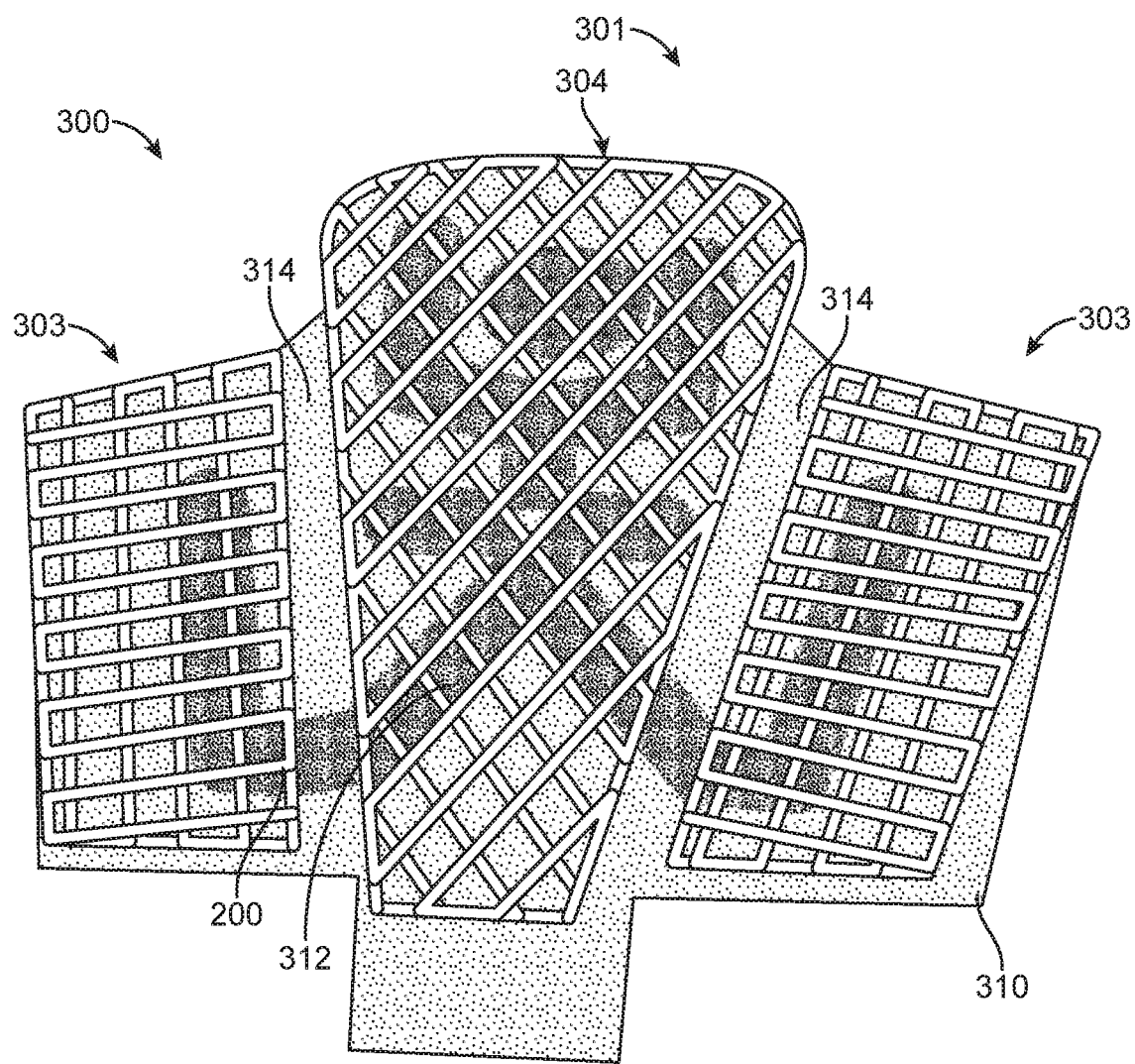
FIG. 20 illustrates a rear view of a bladder according to an embodiment presented herein.

FIGS. 18-20 illustrate bladder 300, according to an embodiment. In certain embodiments, bladder 300 can be incorporated into an article of footwear. For example, in certain embodiments, bladder 300 and extruded member 200 can form an upper or a portion of an upper or a sole or a portion of a sole for an article of footwear. In certain embodiments, bladder 300 can be an inflatable bladder, and can be filled with a fluid medium.

FIG. 18 shows a front view and FIG. 19 shows a perspective view of bladder 300. In certain embodiments, bladder 300 can include central portion 301 and one or more side portions 303. In certain embodiments, bladder 300 can include front side 302 and back side 304 (see FIG. 20). In certain embodiments, bladder 300 can include pump 306 and/or release valve 308. In certain embodiments, bladder 300 can have exterior layer 310 and interior cavity 312. In certain embodiments, interior cavity 312 can be in fluid connection with pump 306 and release valve 308, and configured to contain a fluid medium (e.g., air).

In certain embodiments, one or more extruded members 200 can be extruded onto exterior layer 310 of bladder 300.

In certain embodiments, an adhesive can be applied to exterior layer 310 of bladder 300 prior to adding extruded member 200. In certain embodiments, extruded member 200 can form one or more layers on bladder 300. All or part of bladder 300 can be covered by extruded member 200. In certain embodiments, extruded member 200 can follow a contour or outline of bladder 300.

As shown, for example, on back side 304 in FIG. 20, in certain embodiments, one or more extruded members 200 can be formed on exterior layer 310 of central portion 301 and side portions 303. In certain embodiments, extruded members 200 of central portion 301 and side portions 303 can have a different pattern. For example, central portion 301 can have a cross-hatch pattern and side portions 303 can have a perpendicular mesh pattern. In certain embodiments, extruded member 200 can follow a shape of interior cavity 312. In certain embodiments, fold lines 314 can be formed between extruded members 200 to provide flexibility to bladder 300. Other patterns such as those described herein can be applied to bladder 300.

Other portions of bladder 300 can also be formed from extruded member 200. For example, fitment bodies or covers such as pump cover 306 and release valve body 308 can be formed from extruded member 200. In one embodiment, bladder 300 itself can also be formed from extruded member 200.

In certain embodiments, bladder 300 can be formed using the methods and processes described herein. By way of one non-limiting example, one or more extruded members 200 can be extruded in a continuously contacting pattern to form a bottom layer. A separator (e.g., Teflon paper) can be placed on the bottom layer or a portion of the bottom layer. A release valve and pump can be attached to or positioned on the separator. A top layer can be extruded over the separator, which can prevent the top and bottom layers from bonding adjacent to the separator. The top layer can be extruded over the separator and onto the bottom layer to form intimate contact with the bottom layer in desired areas. The separator can be removed from the formed bladder 300 and a final extruded layer can be added to fully seal the top and bottom layers together at the separator removal slot opening junction.

Figure 21:
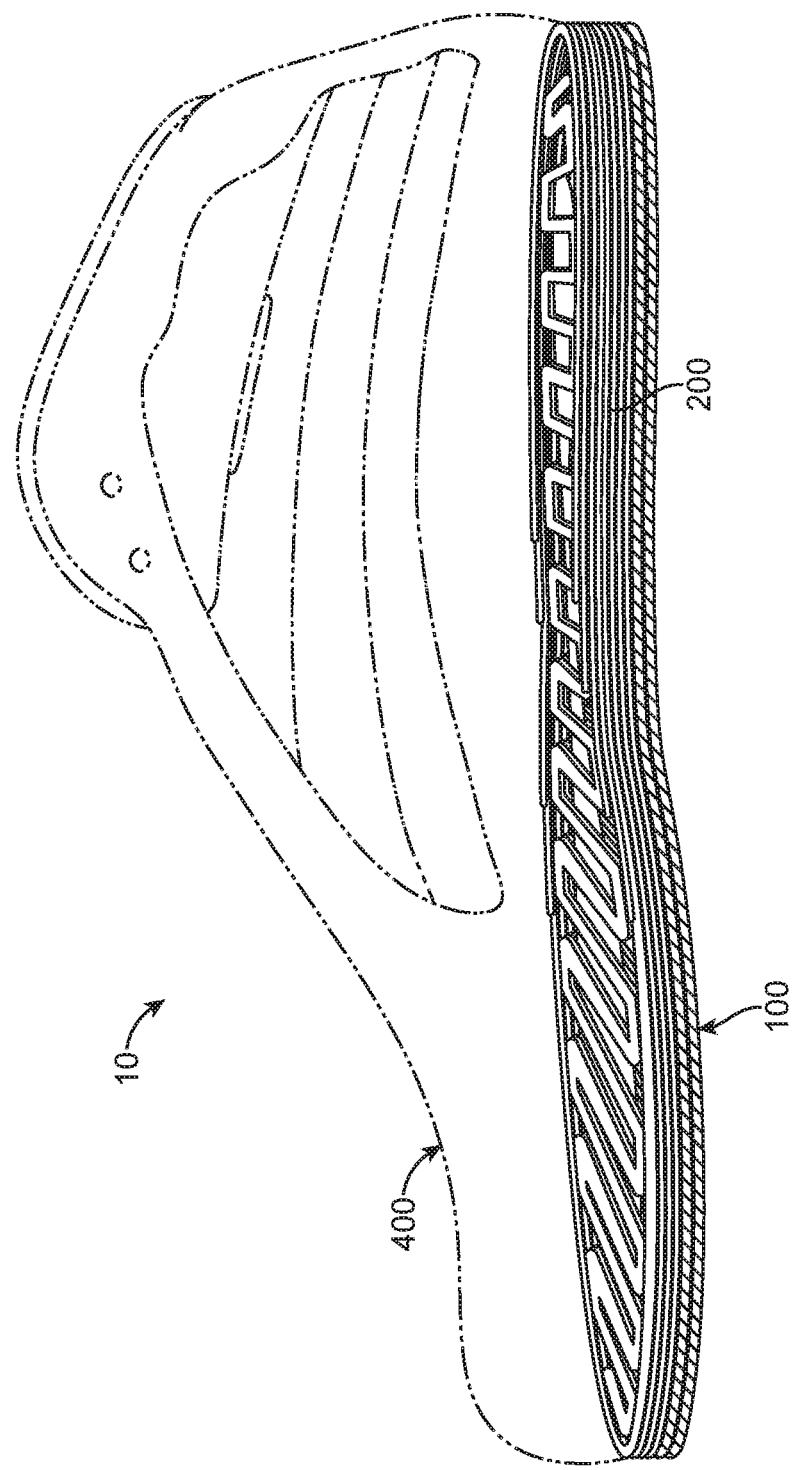
FIG. 21 illustrates an article of footwear according to an embodiment presented herein.

FIG. 21 illustrates an article of footwear 10, according to an embodiment. Article of footwear 10 can include upper 400 and sole 100. In certain embodiments, sole 100 can be formed from extruded member 200, such as described herein. In certain embodiments, sole 100 can be extruded directly on to upper 400. In certain embodiments, upper 400 can be made of a fabric, leather, or synthetic material and extruded member 200 can be extruded directly onto the material. Adhesive can be applied to the material before applying extruded member 200. In certain embodiments, sole 100 can be extruded and upper 400 can be attached thereto, for example by stitching or adhesive. In certain embodiments, portions of both sole 100 and upper 400 can be extruded.

Methods for manufacturing a sole, midsole, portion of a sole, and article of footwear are also contemplated. In certain embodiments, a method for manufacturing a sole for an article of footwear can include extruding one or more elongated members in a controlled geometric pattern, for example, but not limited to, any of the patterns described herein. Extruding the sole can provide advantages over and even eliminate the need for a mold, such as currently used when injection molding soles for articles of footwear. Alternatively, the processes described herein can be used to create a container, vessel, or mold, using one or more extruded members, that other extrusions or cast media can be added to.

The extrusion process can be automated and/or computerized. Automation can provide assembly line production and computerization can provide the ability to modify or customize the design. Robotic mechanisms can be used to facilitate the process. In certain embodiments, the extruder nozzle can be stationary and a surface or other device can be moved in a controlled manner to form the extruded article. In other embodiments, the surface can be stationary and the extruder can move. In certain embodiments, both the surface and extruder can move.

Figure 22:
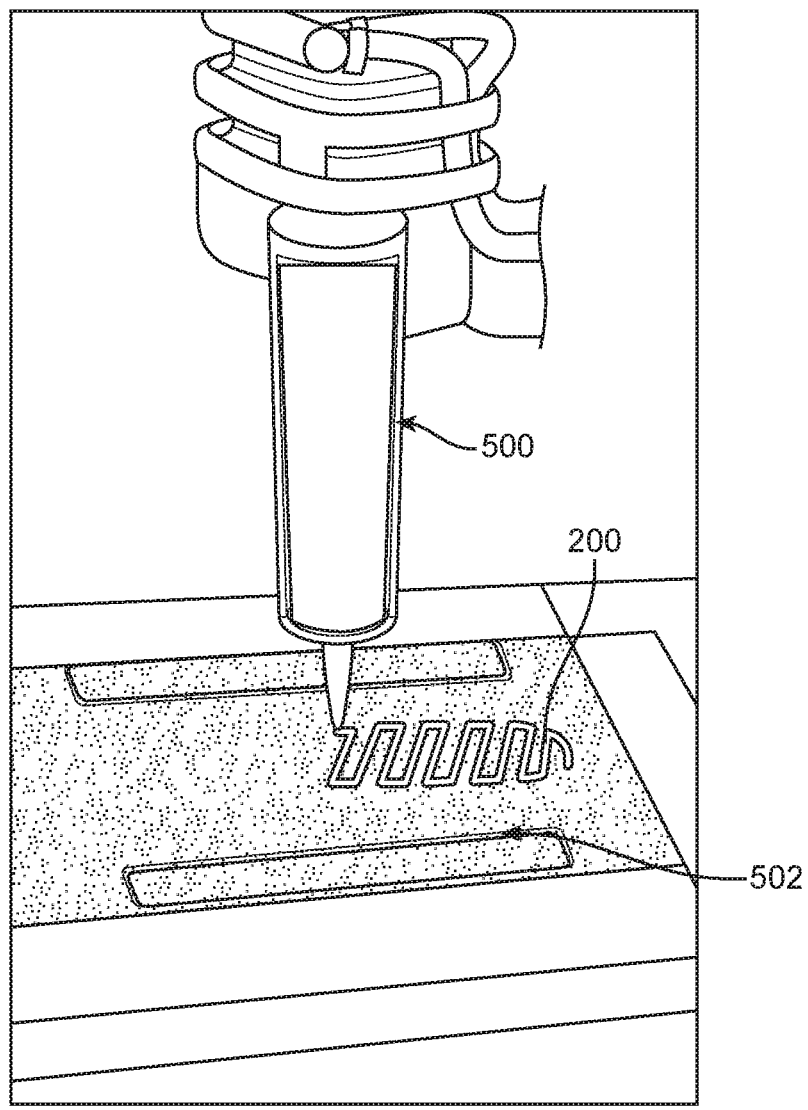
FIG. 22 illustrates and extruder for extruding a sole according to an embodiment presented herein.

FIG. 22 illustrates a sole being extruded, according to an embodiment. In certain embodiments, extruder 500 can form extruded member 200 directly onto surface 502 (e.g., a holder, plate, table, or conveyer belt). In certain embodiments, surface 502 can be a heated or cooled surface. Heating surface 502 can facilitate adhesion between extruded member 200 and, for example, a substrate on surface 502. In certain embodiments, surface 502 can be heated to correspond to the temperature of extruded member 200 as it exits the extruder. Cooling surface 502 can accelerate the rate at which extruded member 502 cools. In certain embodiments, surface 502 can be a vacuum surface. The vacuum surface can hold a substrate or other piece of material in place so that extruded member 200 can be extruded onto it without the material moving. In certain embodiments, a midsole can be directly extruded onto an insole or outsole.

Figure 25:
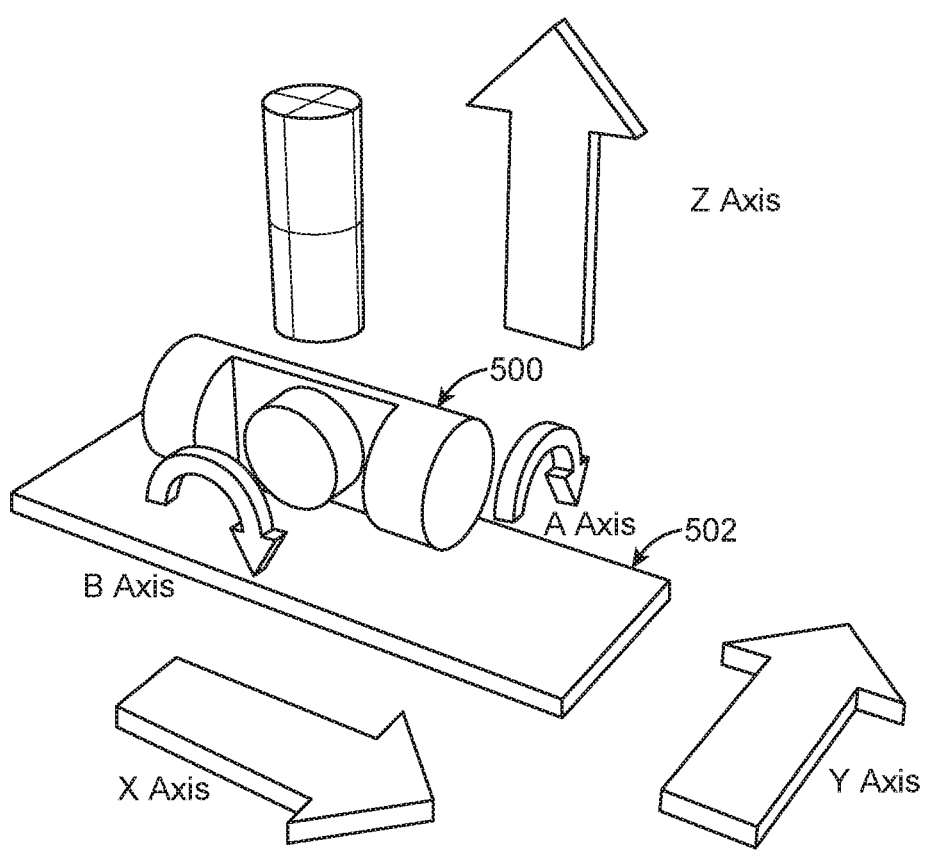
FIG. 25 illustrates a schematic representing movement of an extruder according to an embodiment presented herein.

In certain embodiments, extruder 500 can move according to a pattern while extruding extruded member 200 in order to form a sole. In certain embodiments, surface 502 can move according to a pattern while extruder 500 remains stationary. In certain embodiments, both extruder 500 and surface 502 can move according to a pattern while extruded member 200 is extruded to form the sole. For example, FIG. 25 illustrates movement of an extruder 500 and surface 502 with six degrees of freedom. In certain embodiments, both extruder 500 and surface 502 can move in each of the x-, y-, and z-directions. In certain embodiments, both extruder 500 and surface 502 can rotate in each of these directions (i.e., allowing for roll, pitch, and yaw.)

Figure 26:
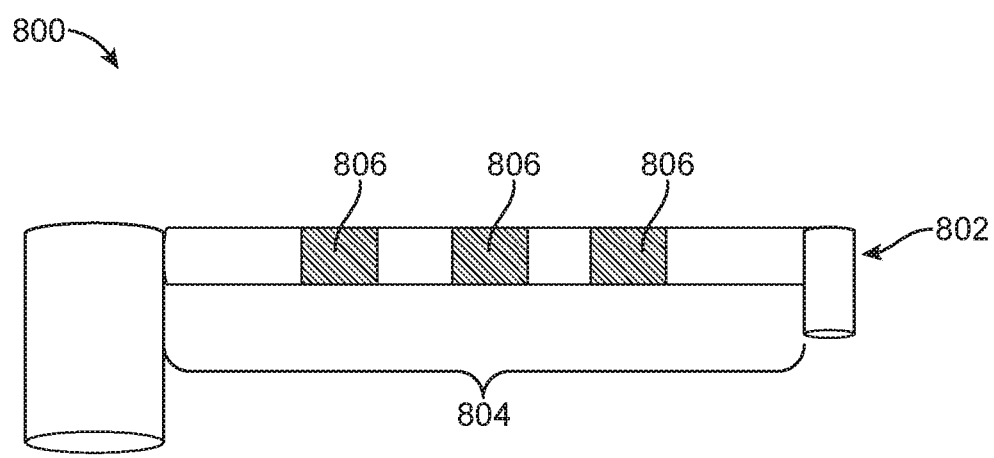
FIG. 26 illustrates an extrusion system according to an embodiment presented herein.

FIG. 26 illustrates extruder system 800 having extruder 802. In certain embodiments, extruder system 800 can include an extrusion arm having an additional heating zone 804 with heating bands 806. Heating bands 806 can maintain the viscosity of the extruded material as it travels along heating zone 804. In certain embodiments, additional heating zone 804 can be approximately 0.5 meters in length, although the length can be longer or shorter. In certain embodiments, additional heating zone 804 can be telescopic, allowing the length to be easily adjusted. By including additional heating zone 804, more space can be provided for a surface to be placed under extruder 802 so that the surface, extruder 802, or both can move freely and safely away from other components of extruder system 800.

Figure 29:
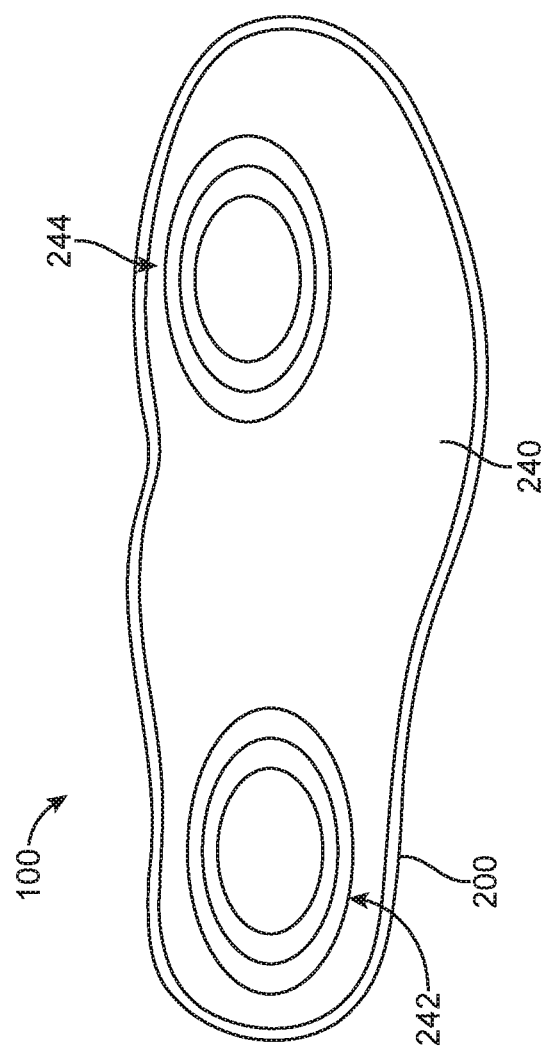
FIG. 29 illustrates a sole for an article of footwear according to an embodiment presented herein.

FIG. 29 illustrates sole 100, according to an embodiment. In certain embodiments, sole 100 can include one or more extruded members 200. In certain embodiments, sole 100 can also or alternatively include substrate 240. For example, substrate 240 can be rubber or foam in the shape of a shoe sole or insert for a shoe. As shown in FIG. 29, sole 100 can include rearfoot region 242 and forefoot region 244. Regions 242 and 244 can be formed from multiple extruded members 200 in a concentric pattern (e.g., concentric circles, ovals, or other shapes). In certain embodiments, there can be space between each concentric extruded member 200 such that each extruded member 200 may move relative to another extruded member 200, which may result in improved cushioning and/or ride for the wearer. In some embodiments, adjacent concentric extruded members 200 may be formed of different materials. In certain embodiments, concentric extruded members 200 can contact each other. Regions 242 and 244 can provide additional cushioning and/or shock absorption at selected areas of sole 100, for example, the heel and under the ball of the foot.

In certain embodiments, the method can include extruding one or more elongated members to form a plurality of layers. In certain embodiments, the method can include extruding a single, continuous elongated member to form the sole.

The extrusion processes described herein can be combined with other methods of manufacturing. For example, a portion of a sole can be formed in a mold and combined with an extruded member. In one embodiment, a thermoplastic cup sole can be extruded and dispensed urethane foam can be added into the cup. In certain embodiments, select portions of a sole can be extruded and then filled with similar or different materials (e.g., dispensed urethane foam). For example, a "skeleton structure" can be formed using an extruded material (e.g., TPU) and filled with another material (e.g., dispensed urethane foam).

Figure 23:
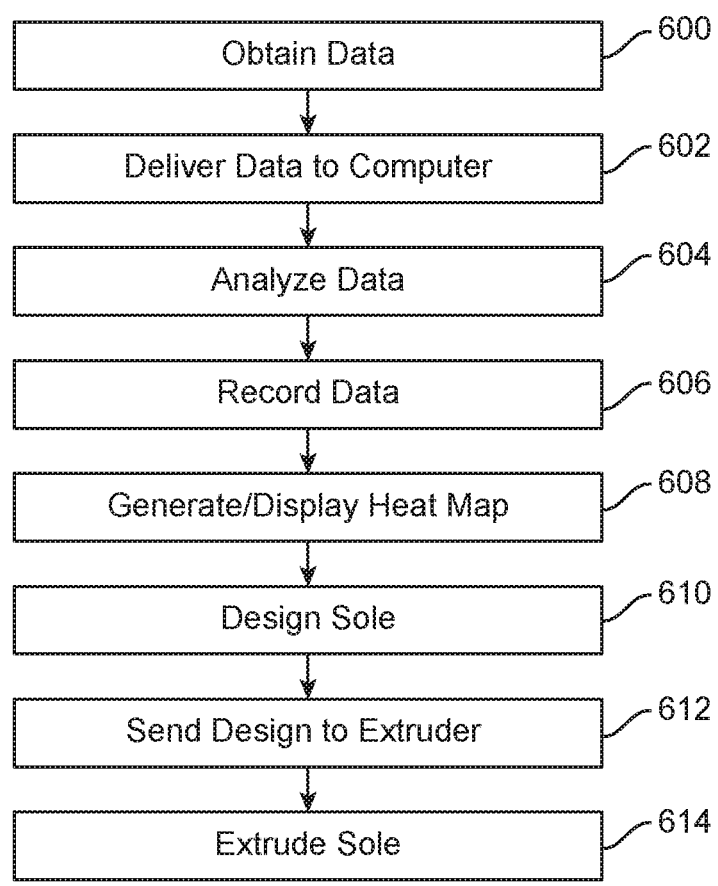
FIG. 23 illustrates a process for manufacturing a sole according to an embodiment presented herein.
Figure 24:
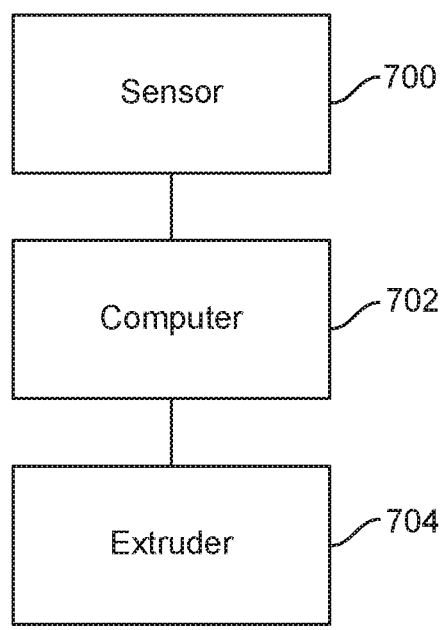
FIG. 24 illustrates components of a system for manufacturing a sole according to an embodiment presented herein.

Forming the sole by means of extrusion can allow for complete customization of the sole by adjusting the pattern and physical properties of the extruded member. FIG. 23 illustrates a process for creating a customized sole, according to an embodiment. FIG. 24 illustrates components of a system for manufacturing a customized sole, according to an embodiment.

In certain embodiments, pressure data for an intended wearer's foot can be obtained (step 600). For example, the intended wearer can stand on a pressure sensor (e.g., sensor pad 700) to determine the pressure distribution of the wearer's foot. In certain embodiments, the pressure data can be delivered to and/or analyzed by a computer 702 (steps 602, 604). The data can be recorded by computer 702 (step 606). In certain embodiments, software on computer 702 can generate a "heat map", which can be presented on a visual display, indicating the relative pressure exerted by each part of the foot (step 608). In certain embodiments, computer 702 can analyze the pressure data to determine an optimal sole design to properly support and cushion each part of the intended wearer's foot (step 610).

In certain embodiments, the pressure data and/or design can be sent to a local or remote computer (e.g., through direct connection, wireless connection, or over the Internet) that can control an extruder 704 (step 612). In this manner, an intended wearer's foot pressure data can be obtained in a retail store and the data can be sent to a manufacturing facility so that the customized sole design can be extruded and incorporated into an article of footwear. Upon receiving the design instructions, extruder 704 can form one or more extruded members in a controlled geometric pattern to create the sole based on the pressure data (step 614). Other data, for example, foot size and shape can similarly be collected, analyzed, and used to create the customized sole. The data can be used separately or collectively.

Referring to FIGS. 23 and 24, a method of manufacturing a sole for an article of footwear can include measuring data of a foot using a sensor 700, sending the data to computer 702, which is configured to control extruder 704, and extruding one or more extruded members 200 in a controlled geometric pattern to form the sole based on the data. In certain embodiments, the data can be recorded in a memory of computer 702. In certain embodiments, computer 702 can analyze the data. In certain embodiments a pattern for the sole can be designed based on the data. In certain embodiments, computer 702 can control extruder 704 to form a sole, without first obtaining data. For example, computer 702 can implement pre-programmed patterns for soles.

Other parts of articles of footwear and entire articles of footwear can be made using one or more extruded members and the methods, processes and/or components described herein. For example, an upper or a portion of an upper can be formed from an extruded member. In certain embodiments, one or more extruded members can be extruded onto a piece of material (e.g., fabric or synthetic) to form an upper or a portion of an upper. In certain embodiments, one or more layers of textile material can be inserted over or between one or more layers of an extruded member to form an upper. In certain embodiments, an article of footwear including a sole and an upper can be formed from one or more extruded members as a single, unitary structure. By way of example, in certain embodiments, one or more extruded members can be extruded onto fabric to form an upper, a midsole, quarter panels, heel counter, etc., and the fabric can be formed, cut, or sewn to form an article of footwear.

In certain embodiments, extruded members can form other parts of an article of footwear, for example, heel counters, lace holders, etc. In certain embodiments, a last can be used, upon which the extruded member can be formed. After the extruded material cools, cures, or reacts, the last can be removed and the extruded member can retain its shape forming the upper. In certain embodiments, one or more extruded members can be extruded and manually manipulated to form an upper or any other portion of an article of footwear.

Figure 28:
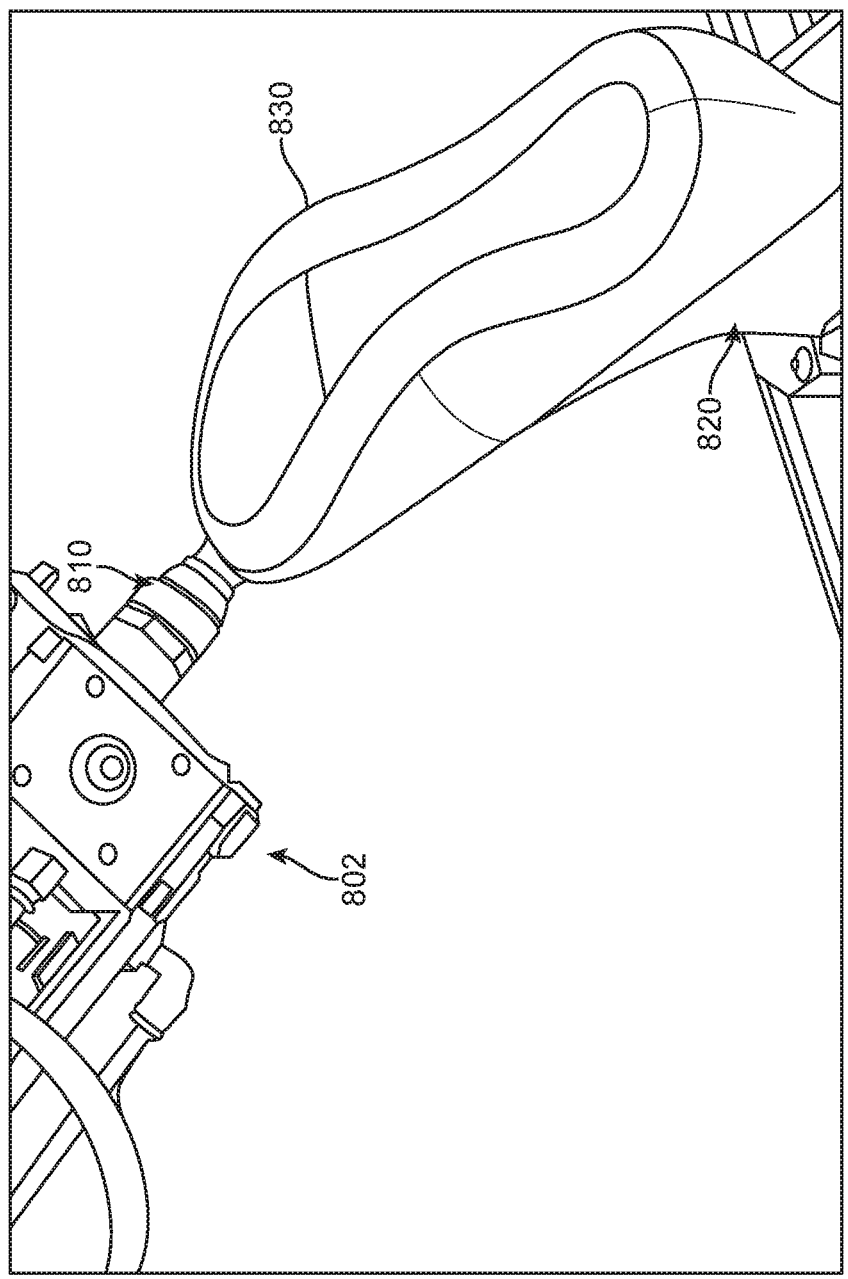
FIG. 28 illustrates an extrusion and last system according to an embodiment presented herein.

In certain embodiments, for example, as shown in FIG. 28, extrusion can be combined with traditional lasting techniques. Upper 830 can be placed on last 820. In certain embodiments, upper 830 and last 820 can be scanned by a computing device to define spatial data so that the sole is accurately extruded onto upper 830. Extruder 802 can then extrude a sole onto upper 830 via extruder nozzle 810. This process can be automated to increase production speed, for example, in an assembly line manner.

In certain embodiments, patterns for uppers can include flexible and non-flexible areas. In certain embodiments, patterns can include stretchable and non-stretchable areas. In certain embodiments, textile material can surround one or more extruded members forming the upper. In certain embodiments, inserts (e.g., foam layers) can be included in portions of an upper.

Other articles of manufacture can be formed or include parts formed according to the methods described herein. By way of example, extruded members can be incorporated with other sporting goods equipment, such as, but not limited to, pads (including, but not limited to knee pads, elbow pads, shoulder pads, shin guards, and chest protectors), helmets, gloves, sticks, skates, golf clubs, grips, and balls. For example, an extruded member can be formed directly onto protective padding to provide additional impact absorption. In certain embodiments, concentric circles, spirals or other features in these areas can provide protection or support. In certain embodiments, the extruded member can be extruded onto a substrate material (e.g., mesh) to improve adhesion of the extruded member to the protective padding.

By way of further example, a chest protector incorporating one or more extruded member 200 can be formed. In certain embodiments, an extruded member 200 can be extruded onto a textile or synthetic material that is in the shape of a chest protector. The extruded member 200 can form the bulk of the protective material. Certain areas of the extruded material 200 can be thinner, for example to allow fastening elements to be attached to the chest protector. An extruded member 200 can outline an area that can be filled with another material (e.g., dispensed foam) that can provide protection without significantly increasing weight. It will be appreciated that in other embodiments the substrate may include textiles or synthetic materials sized and shaped for any desired product, including portions of a footwear upper and apparel.

One or more extruded members can also be formed in a controlled pattern to create apparel, including, but not limited to, pants, shorts, shirts, jackets, hats, etc. In certain embodiments, articles of apparel can be formed by extruding one or more extruded members over, on, around, or in a shaped mold or cast, for example. In certain embodiments, articles of apparel can be formed in three-dimensional shapes. In certain embodiments, after the extruded material is ready (e.g., after it cools, cures, reacts, etc., as necessary) the extruded member or members can be removed, retaining its shape as the article of apparel.

In certain embodiments, inserts (e.g., textiles, foams, plastics, etc.) can be included in the articles of apparel. Articles of apparel can include areas of extruded material to provide cushioning or padding. In certain embodiments, elbow, knee, or other areas of apparel can include extruded material. For example, concentric circles or spirals in these areas can provide protection or support. Extruded material can also be added to apparel for aesthetic or fashion purposes. For example, extruded accents, piping, or designs can be added to apparel.

While various embodiments have been described herein, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various needs as would be appreciated by one of skill in the art.

It is to be understood that the phraseology or terminology used herein is for the purpose of description and not of limitation. The breadth and scope of the present disclosure should not be limited by any of the above-described exemplary embodiments, but should be defined only in accordance with the following claims and their equivalents.

What is claimed is:

1. A method of making a sole for an article of footwear, the method comprising:
    extruding a single continuous elongate member to form a first layer of the sole, the first layer having a pattern; and
    extruding a single continuous elongate member to form a second layer of the sole, the second layer having the pattern and positioned directly on top of the first layer such that the continuous elongate member of the second layer is aligned with the continuous elongate member of the first layer,
    wherein the single continuous elongate member of the first layer and the single continuous elongate member of the second layer form a medial sidewall of the sole and a lateral sidewall of the sole.

2. The method of claim 1, wherein extruding a single continuous elongate member to form the first layer is continuous with extruding a single continuous elongate member to form the second layer.

3. The method of claim 1, wherein the first and second layers extend from a heel region of the sole to a toe region of the sole along a medial side of the sole and a lateral side of the sole.

4. The method of claim 1, further comprising extruding a single continuous elongate member to form a third layer of the sole, the third layer having the pattern and positioned directly on top of the second layer.

5. The method of claim 1, wherein the pattern comprises loops, and wherein the loops of the second layer are disposed directly on top of the loops of the first layer.

6. The method of claim 1, wherein the first layer and the second layer are each planar.

7. The method of claim 1, wherein the pattern is planar.

8. The method of claim 1, wherein the pattern extends from a heel region of the sole to a toe region of the sole.

9. A method of making a sole for an article of footwear, the method comprising:
    extruding a single continuous elongate member in a pattern to form a first layer of the sole; and
    extruding a single continuous elongate member to form a second layer of the sole, wherein the entire second layer is positioned directly on top of the first layer such that the single continuous elongate member of the second layer follows the pattern of the single continuous elongate member of the first layer,
    wherein the single continuous elongate member of the first layer and the single continuous elongate member of the second layer form a medial sidewall of the sole and a lateral sidewall of the sole.

10. The method of claim 9, wherein the entire first layer is positioned directly underneath the second layer.

11. The method of claim 9, wherein extruding a single continuous elongate member to form the first layer is continuous with extruding a single continuous elongate member to form the second layer.

12. The method of claim 9, wherein the first and second layers extend from a heel region of the sole to a toe region of the sole along a medial side of the sole and a lateral side of the sole.

13. The method of claim 9, further comprising extruding a single continuous elongate member to form a third layer of the sole, the third layer having the pattern and positioned directly on top of the second layer.

14. The method of claim 9, wherein the pattern comprises loops, and wherein the loops of the second layer are disposed directly on top of the loops of the first layer.

15. The method of claim 9, wherein the first layer and the second layer are each planar.

16. The method of claim 9, wherein the pattern is planar.

17. The method of claim 9, wherein the pattern extends from a heel region of the sole to a toe region of the sole.

* * * * *